(12) United States Patent
Trivedi et al.

(10) Patent No.: US 10,833,923 B2
(45) Date of Patent: Nov. 10, 2020

(54) DYNAMIC MULTIPLE ACCESS FOR DISTRIBUTED DEVICE COMMUNICATION NETWORKS WITH SCHEDULED AND UNSCHEDULED TRANSMISSIONS

(71) Applicant: SKYLO TECHNOLOGIES INC., Palo Alto, CA (US)

(72) Inventors: Parthsarathi Trivedi, Palo Alto, CA (US); Andrew Kalman, Stanford, CA (US); Andrew Nuttall, Stanford, CA (US)

(73) Assignee: SKYLO TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 15/795,026

(22) Filed: Oct. 26, 2017

(65) Prior Publication Data
US 2019/0132196 A1 May 2, 2019

(51) Int. Cl.
*H04L 12/24* (2006.01)
*H04W 74/02* (2009.01)
*H04L 29/08* (2006.01)

(52) U.S. Cl.
CPC ...... *H04L 41/0803* (2013.01); *H04L 41/0896* (2013.01); *H04W 74/02* (2013.01); *H04L 67/1097* (2013.01); *H04L 67/12* (2013.01)

(58) Field of Classification Search
CPC ............ H04L 41/0803; H04L 41/0896; H04L 41/0213; H04L 41/0266; H04L 41/08
See application file for complete search history.

(56) References Cited

U.S. PATENT DOCUMENTS 6,046,980 A * 4/2000 Packer ................ H04L 41/0213
370/229
7,668,925 B1 2/2010 Liao et al.
(Continued)

FOREIGN PATENT DOCUMENTS

KR 20090029464 A 3/2009
WO WO-2011109424 A1 9/2011
(Continued)

OTHER PUBLICATIONS

Co-pending U.S. Appl. No. 15/872,761, filed Jan. 16, 2018.
(Continued)

*Primary Examiner* — Jason D Recek
(74) *Attorney, Agent, or Firm* — Wilson Sonsini Goodrich & Rosati

(57) ABSTRACT

Disclosed herein are systems and networks comprising a network operations server application for improving a packet-switched communications network, the application configured to: receive data from data source nodes; provide a management console allowing a user to configure a network multi-access protocol for: i) a node, ii) a type of node, iii) a group of nodes, iv) a type of data packet from a node, v) a type of data packet from a type of node, vi) a type of data packet from a group of nodes, or vii) a specific instance of a data packet from a node, the network multi-access protocol a scheduled or random access protocol; and dynamically create channel assignments to allocate bandwidth of the network among channels based on the configured network multi-access protocols to prevent network saturation and minimize data collisions in the packet-switched network.

26 Claims, 7 Drawing Sheets

(56) References Cited

U.S. PATENT DOCUMENTS

| | | | |
|---|---|---|---|
| 7,889,721 B2 * | 2/2011 | Igval | H04L 65/602 370/352 |
| 8,185,629 B2 | 5/2012 | Hoeksel | |
| 8,620,336 B2 | 12/2013 | Golaup et al. | |
| 9,154,994 B2 | 10/2015 | Fox et al. | |
| 9,288,611 B2 | 3/2016 | Miller, II et al. | |
| 9,300,453 B2 | 3/2016 | Kaczmarska-Wojtania et al. | |
| 9,407,575 B2 | 8/2016 | Herriot et al. | |
| 9,473,514 B1 | 10/2016 | Chou et al. | |
| 9,635,057 B2 | 4/2017 | Bone et al. | |
| 9,736,553 B2 | 8/2017 | Shaw et al. | |
| 9,838,258 B2 | 12/2017 | Wang et al. | |
| 9,848,279 B2 | 12/2017 | Cui et al. | |
| 9,860,677 B1 | 1/2018 | Agerstam et al. | |
| 9,860,906 B2 | 1/2018 | Shaw et al. | |
| 9,866,637 B2 | 1/2018 | Doraiswamy et al. | |
| 2002/0103803 A1 * | 8/2002 | Chantrain | H04L 12/2856 |
| 2002/0124094 A1 * | 9/2002 | Chang | H04L 41/046 709/230 |
| 2002/0175938 A1 * | 11/2002 | Hackworth | H04L 67/42 715/751 |
| 2003/0033519 A1 | 2/2003 | Buckman et al. | |
| 2004/0149918 A1 * | 8/2004 | Craig | G01J 1/00 250/370.01 |
| 2006/0164534 A1 | 7/2006 | Robinson et al. | |
| 2007/0081468 A1 | 4/2007 | Timus | |
| 2007/0121652 A1 | 5/2007 | Wehren | |
| 2007/0294133 A1 * | 12/2007 | Lasker | G06Q 30/02 709/230 |
| 2008/0259919 A1 | 10/2008 | Monga | |
| 2008/0276003 A1 * | 11/2008 | Dudley | H04L 65/1016 709/242 |
| 2011/0045818 A1 | 2/2011 | Banks et al. | |
| 2011/0139867 A1 * | 6/2011 | Meyer | G06F 16/9554 235/375 |
| 2011/0191011 A1 * | 8/2011 | McBride | H04L 41/0823 701/117 |
| 2011/0255445 A1 * | 10/2011 | Johnson | H04W 4/006 370/255 |
| 2012/0198222 A1 * | 8/2012 | Tukol | G06F 9/44505 713/2 |
| 2013/0017827 A1 | 1/2013 | Muhanna et al. | |
| 2013/0182566 A1 | 7/2013 | Goergen et al. | |
| 2013/0215867 A1 | 8/2013 | Gomez et al. | |
| 2014/0126581 A1 | 5/2014 | Wang et al. | |
| 2014/0128088 A1 * | 5/2014 | Farhadi | H04W 16/16 455/452.1 |
| 2014/0162677 A1 | 6/2014 | De et al. | |
| 2014/0237080 A1 | 8/2014 | Stanwood et al. | |
| 2014/0273080 A1 | 9/2014 | Apffel, Jr. et al. | |
| 2014/0362688 A1 * | 12/2014 | Zhang | H04W 72/0486 370/230 |
| 2015/0055557 A1 | 2/2015 | Dong et al. | |
| 2015/0200809 A1 * | 7/2015 | Wittenschlaeger | H04L 41/0806 370/401 |
| 2015/0241873 A1 | 8/2015 | Goldenberg et al. | |
| 2015/0312277 A1 | 10/2015 | Rane et al. | |
| 2016/0098305 A1 | 4/2016 | Bucsa et al. | |
| 2016/0164831 A1 | 6/2016 | Kim | |
| 2016/0198471 A1 * | 7/2016 | Young | H04L 5/0037 370/329 |
| 2017/0006141 A1 | 1/2017 | Bhadra | |
| 2017/0064731 A1 | 3/2017 | Wang et al. | |
| 2017/0078826 A1 | 3/2017 | Cui et al. | |
| 2017/0083312 A1 | 3/2017 | Pindado et al. | |
| 2017/0086054 A1 | 3/2017 | Azevedo et al. | |
| 2017/0105131 A1 | 4/2017 | Song et al. | |
| 2017/0163444 A1 | 6/2017 | McLaughlin et al. | |
| 2017/0187807 A1 * | 6/2017 | Clernon | H04W 4/70 |
| 2017/0188389 A1 | 6/2017 | Takahashi et al. | |
| 2017/0215023 A1 | 7/2017 | Ly et al. | |
| 2017/0257289 A1 | 9/2017 | Cui et al. | |
| 2017/0318117 A1 | 11/2017 | Stenneth | |
| 2018/0013824 A1 | 1/2018 | Knopf | |
| 2019/0239048 A1 | 8/2019 | Nuttall et al. | |

FOREIGN PATENT DOCUMENTS

| | | |
|---|---|---|
| WO | WO-2016096978 A1 | 6/2016 |
| WO | WO-2016139408 A1 | 9/2016 |
| WO | WO-2016142684 A1 | 9/2016 |
| WO | WO-2017064565 A1 | 4/2017 |
| WO | WO-2017081490 A1 | 5/2017 |
| WO | WO-2019084266 A1 | 5/2019 |
| WO | WO-2019143517 A1 | 7/2019 |

OTHER PUBLICATIONS

U.S. Appl. No. 15/872,761 Office Action dated Apr. 23, 2018.
U.S. Appl. No. 15/872,761 Office Action dated Sep. 6, 2018.
PCT/US2018/057507 International Search Report and Written Opinion dated Feb. 12, 2019.
PCT/US2019/013015 International Search Report and Written Opinion dated May 1, 2019.
U.S. Appl. No. 16/379,483 Office Action dated Nov. 15, 2019.

* cited by examiner

DYNAMIC MULTIPLE ACCESS FOR DISTRIBUTED DEVICE COMMUNICATION NETWORKS WITH SCHEDULED AND UNSCHEDULED TRANSMISSIONS

BACKGROUND OF THE INVENTION

In device communication networks, devices are linked together to exchange information and share data. The speed, capacity, and responsiveness of communications between devices are limited by the available bandwidth of the communications channels employed.

SUMMARY OF THE INVENTION

Efficient use of bandwidth in device communication networks is of vital importance in maintaining quality of service for devices on the network in addition to increasing the network's capacity. In a packet-switched network of limited capacity, traffic needs to be managed to avoid saturating the available bandwidth. Traditional network protocols use collision detection and collision avoidance to manage access to the shared network bandwidth. However, with the ever-growing networks in which a large number (e.g., millions or more) of devices are simultaneously present on the network, a more efficient means of managing collision detection and avoidance is required as not to lose data or increase network congestion. For example, cellular providers' networks may be locally saturated at a nationally televised sporting event where a large number of the fans in the stadium are live-streaming the game on their smartphones.

Many traditional random and responsiveness-dependent network connections (e.g., VoIP, purchasing, and alarms) require specific network performance characteristics to provide a desired user experience, which require larger overhead costs to ensure these specifications are met. However there is a certain class of machine-to-machine (M2M) transmissions (e.g., remote sensors, tracking beacons, and smart hardware) that have data they would like to transmit across the network, but are less sensitive to the timing and responsiveness of the transmission. For example, it is important to remotely read a utility meter, but it is not imperative that the meter be read within that minute of the day. Hence, network access protocols can be adapted to take advantage of the looser requirements of these types of devices to provide a boost in overall network efficiency.

The systems and networks disclosed herein includes an adaptive and dynamic multiple access protocol scheme for limited bandwidth networks through the use of both random access and scheduled data transmissions. For traffic over the network that has strict responsiveness requirements, random access protocols can be used, while traffic with lesser responsiveness requirements can be sent using a scheduled access protocol. The designation between random access and scheduled traffic can be made dynamically on a per device basis, or it can be defined on an individual packet level. For example, a temperature sensing unit could transmit measurements at a predefined schedule using the scheduled multi-access protocol, but in situations where the temperature is outside of a certain threshold the same data packets are routed using the random access protocol to provide the desired level of responsiveness for that situation.

In some embodiments, the systems and networks disclosed herein allow each device that is connected to the network to be actively managed by the user to select the type of multi-access protocol it wants to use, either scheduled, random access, or a hybrid of the two. In some embodiments, the transmission mode information is maintained locally, for example, in the user's modem, remotely, for example in a centralized network management server, or both. Through this approach, users can assign specific timeslots for portions of their data to be transmitted that are guaranteed to be free of any collisions. In some embodiments, the network's assignment of scheduled and random access data channels evolves dynamically as a function of network loading, observed trends, and local time. In some embodiments, the systems and networks disclosed herein enable one or more of 7 classes of service or network access modes: 1) near real-time, 2) store and forward, 3) on-demand reporting, 4) fixed interval transmission, 5) scheduled transmission, 6) emergency, and 7) always-on.

In one aspect, disclosed herein are computer-implemented systems comprising: a digital processing device comprising: at least one processor, an operating system configured to perform executable instructions, a memory, and instructions executable by the digital processing device to create a network operations server (NOS) application for improving efficiency of a packet-switched communications network, the application configured to: receive data from a plurality of data source nodes; provide a management console allowing a user to configure a network multi-access protocol for: i) a node, ii) a type of node, iii) a group of nodes, iv) a type of data packet from a node, v) a type of data packet from a type of node, vi) a type of data packet from a group of nodes, and vii) a specific instance of a data packet from a node, the network multi-access protocol a scheduled access protocol or a random access protocol; and dynamically create channel assignments to allocate bandwidth of the network among channels based on the configured network multi-access protocols to prevent network saturation and minimize data collisions in the packet-switched network. In some embodiments, the application is further configured to coordinate with the data source nodes to provide a core set of network routing capabilities to enable a node, a type of node, or a group of nodes, to independently and dynamically route a type of data packet or a specific instance of a data packet through the network in response to the user configuration. In some embodiments, the plurality of data source nodes comprises a plurality of Internet-of-Things (IoT) data source nodes. In some embodiments, the plurality of data source nodes comprises at least 1,000, at least 10,000, at least 100,000, or at least 1,000,000 IoT data source nodes. In some embodiments, the communications network is bandwidth-constrained. In some embodiments, the scheduled access protocol is implemented as one or more of: store and forward; fixed interval transmission; and fixed schedule transmission. In some embodiments, the random access protocol is implemented as one or more of: near real-time priority; on-demand reporting; out-of-threshold or emergency transmission; and always-on dedicated channel. In some embodiments, the channel assignments are created and traffic is routed among channels further based on channel characteristics selected from: frequency, bandwidth, and modulation.

In another aspect, disclosed herein are packet-switched communications networks comprising: a plurality of data source nodes; and a network operations server (NOS) receiving data from the nodes via a wireless link, the NOS configured to: provide a management console allowing a user to configure a network multi-access protocol for: i) a node, ii) a type of node, iii) a group of nodes, iv) a type of data packet from a node, v) a type of data packet from a type of node, vi) a type of data packet from a group of nodes, and vii) a specific instance of a data packet from a node, the network multi-access protocol a scheduled access protocol or a random access protocol; and dynamically create channel assignments to allocate bandwidth of the network among channels based on the configured network multi-access protocols to prevent network saturation and minimize data collisions in the packet-switched network. In some embodiments, the application is further configured to coordinate with the data source nodes to provide a core set of network routing capabilities to enable a node, a type of node, or a group of nodes, to independently and dynamically route a type of data packet or a specific instance of a data packet through the network in response to the user configuration. In some embodiments, the plurality of data source nodes comprises a plurality of Internet-of-Things (IoT) data source nodes. In some embodiments, the plurality of data source nodes comprises at least 1,000, at least 10,000, at least 100,000, or at least 1,000,000 IoT data source nodes. In some embodiments, the wireless link is a bandwidth-constrained backhaul link. In some embodiments, the scheduled access protocol is implemented as one or more of store and forward; fixed interval transmission; and fixed schedule transmission. In some embodiments, the random access protocol is implemented as one or more of: near real-time priority; on-demand reporting; out-of-threshold or emergency transmission; and always-on dedicated channel. In some embodiments, the channel assignments are created and traffic is routed among channels further based on channel characteristics selected from: frequency, bandwidth, and modulation.

In another aspect, disclosed herein are computer-implemented systems comprising: a digital processing device comprising: at least one processor, an operating system configured to perform executable instructions, a memory, and instructions executable by the digital processing device to create a network operations server (NOS) application for improving efficiency of a packet-switched communications network, the application configured to: receive data from a plurality of data source nodes, the plurality of data source nodes comprising: at least one human-operated node generating human-to-machine communications (H2M) and at least one machine-operated node generating machine-to-machine (M2M) communications; provide a management console allowing a user to configure a network multi-access protocol for: i) each human-operated node, ii) a group of human-operated nodes, iii) a type of data packet from the human-operated nodes, iv) a specific instance of a data packet from a human-operated node, v) each machine-operated node, vi) a group of machine-operated nodes, vii) a type of data packet from the machine-operated nodes, and viii) a specific instance of a data packet from a machine-operated node, the network multi-access protocol a scheduled access protocol or a random access protocol; and dynamically allocate network capacity among one or more channels that use random access protocols and one or more channels that use scheduled access protocols among the nodes to adjust for temporal requirements of the H2M communications and the M2M communications thus preventing network saturation and minimizing data collisions in the packet-switched communications network. In some embodiments, the application is further configured to coordinate with the data source nodes to provide a core set of network routing capabilities to enable a node, a type of node, or a group of nodes, to independently and dynamically route a type of data packet or a specific instance of a data packet through the network in response to the user configuration. In some embodiments, the plurality of data source nodes comprises at least 1,000, at least 10,000, at least 100,000, or at least 1,000,000 machine-operated data source nodes. In some embodiments, the communications network is capacity-constrained. In some embodiments, the scheduled access protocols are implemented as one or more of: store and forward; fixed interval transmission; and fixed schedule transmission. In some embodiments, the random access protocols are implemented as one or more of: near real-time priority; on-demand reporting; out-of-threshold or emergency; and always-on dedicated channel. In some embodiments, the network capacity is allocated among channels further based on channel characteristics selected from: frequency, bandwidth, and modulation.

In another aspect, disclosed herein are packet-switched communications networks comprising: a plurality of data source nodes comprising: at least one human-operated node generating human-to-machine communications (H2M) and at least one machine-operated node generating machine-to-machine (M2M) communications; and a network operations server (NOS) receiving data from the nodes via a wireless link, the NOS configured to: provide a management console allowing a user to configure a network multi-access protocol for: i) each human-operated node, ii) a group of human-operated nodes, iii) a type of data packet from the human-operated nodes, iv) a specific instance of a data packet from a human-operated node, v) each machine-operated node, vi) a group of machine-operated nodes, vii) a type of data packet from the machine-operated nodes, and viii) a specific instance of a data packet from a machine-operated node, the network multi-access protocol a scheduled access protocol or a random access protocol; and dynamically allocate network capacity among one or more channels that use random access protocols and one or more channels that use scheduled access protocols among the nodes to adjust for temporal requirements of the H2M communications and the M2M communications thus preventing network saturation and minimizing data collisions in the packet-switched communications network. In some embodiments, the application is further configured to coordinate with the data source nodes to provide a core set of network routing capabilities to enable a node, a type of node, or a group of nodes, to independently and dynamically route a type of data packet or a specific instance of a data packet through the network in response to the user configuration. In some embodiments, the plurality of data source nodes comprises at least 1,000, at least 10,000, at least 100,000, or at least 1,000,000 machine-operated data source nodes. In some embodiments, the wireless link is a bandwidth-constrained backhaul link. In some embodiments, the scheduled access protocols are implemented as one or more of: store and forward; fixed interval transmission; and fixed schedule transmission. In some embodiments, the random access protocols are implemented as one or more of: near real-time priority; on-demand reporting; out-of-threshold or emergency transmission; and always-on dedicated channel. In some embodiments, the network capacity is allocated among channels further based on channel characteristics selected from: frequency, bandwidth, and modulation.

In yet another aspect, disclosed herein are bandwidth-constrained communications networks comprising: a plurality of nodes and a network operations server (NOS); the nodes and the NOS configured to communicate bidirectionally using datagrams; the NOS configured to support at least one random access data channel and at least one scheduled multi-access data channel; the nodes configured to dynamically switch between the at least one random access data channel and the at least one scheduled multi-access data channel on a per packet basis to prevent network saturation and minimize data collisions.

In yet another aspect, disclosed herein are communications networks comprising: a plurality of nodes and a centralized server; the centralized server configured to present a console allowing a user to define a plurality of network multi-access protocols and assign a network multi-access protocols to each node, wherein the plurality of network multi-access protocols comprises at least one protocol specifying data transmissions at predefined times and at least one protocol specifying data transmissions on an as needed basis; the centralized server further configured to manage communications across the network by issuing the assignments of the defined protocols to the nodes.

In yet another aspect, disclosed herein are capacity-constrained communications networks comprising: a plurality of nodes and a centralized server; the plurality of nodes comprising at least one human-operated node generating human-to-machine communications (H2M) and at least one machine-operated node generating machine-to-machine (M2M) communications; the centralized server configured to dynamically allocate network capacity between one or more random access data channels and one or more scheduled access data channels among the nodes to adjust for temporal requirements of the H2M communications and the M2M communications thus preventing network saturation and minimizing data collisions.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION OF THE INVENTION

Figure 1:
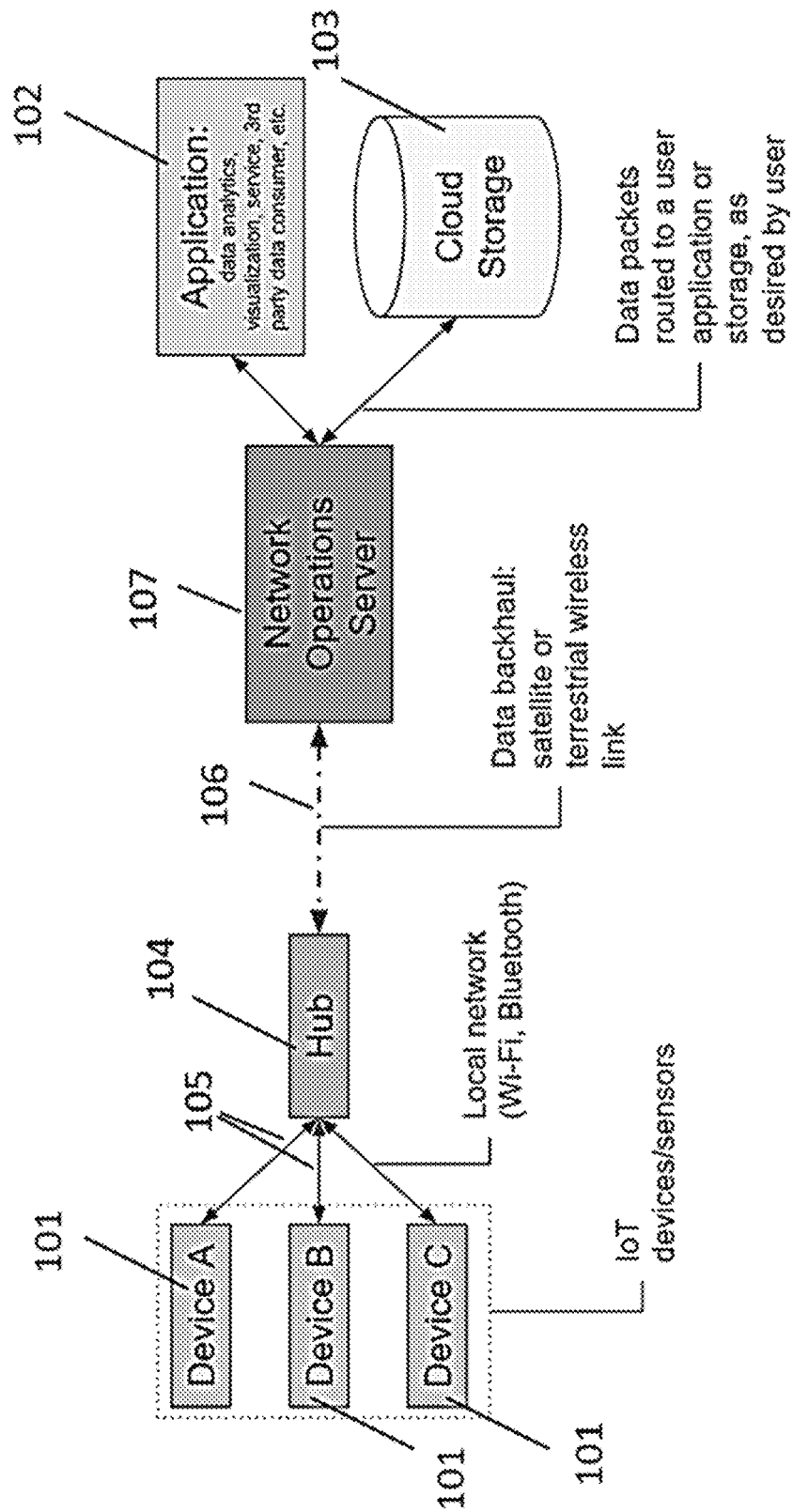
FIG. 1 shows a non-limiting exemplary embodiment of the systems and networks herein; in this case, data communication between devices and the user's desired application(s) or storage(s) through a hub and a central network operations server (NOS)

Efficient use of bandwidth in device communication networks is of vital importance in maintaining quality of service for devices on the network in addition to increasing the network's capacity. In a packet-switched network of limited capacity, traffic needs to be managed to avoid saturating the available bandwidth. Traditional network protocols use collision detection and collision avoidance to manage access to the shared network bandwidth. However, with the ever-growing networks in which a large number (e.g., millions or more) of devices are simultaneously present on the network, a more efficient means of managing collision detection and avoidance is required as not to lose data or increase network congestion.

Many traditional random and responsiveness-dependent network connections (e.g., VoIP, purchasing, and alarms) require specific network performance characteristics to provide a desired user experience, which require larger overhead costs to ensure these specifications are met. However there is a certain class of machine-to-machine (M2M) transmissions (e.g., remote sensors, tracking beacons, and smart hardware) that have data they would like to transmit across the network, but are less sensitive to the timing and responsiveness of the transmission. For example, it is important to remotely read a utility meter, but it is not imperative that the meter be read within that minute of the day. Hence, network access protocols can be adapted to take advantage of the looser requirements of these types of devices to provide a boost in overall network efficiency.

The systems and networks disclosed herein includes an adaptive and dynamic multiple access protocol scheme for limited bandwidth networks through the use of both random access and scheduled data transmissions. For traffic over the network that has strict responsiveness requirements, random access protocols can be used, while traffic with lesser responsiveness requirements can be sent using a scheduled access protocol. The designation between random access and scheduled traffic can be made dynamically on a per device basis, or it can be defined on an individual packet level. For example, a temperature sensing unit could transmit measurements at a predefined schedule using the scheduled multi-access protocol, but in situations where the temperature is outside of a certain threshold the same data packets are routed using the random access protocol to provide the desired level of responsiveness for that situation.

In some embodiments, the systems and networks disclosed herein allow each device that is connected to the network to be actively managed by the user to select the type of multi-access protocol it wants to use, either scheduled, random access, or a hybrid of the two. In some embodiments, the transmission mode information is maintained locally, for example, in the user's modem, remotely, for example in a centralized network management server, or both. Through this approach, users can assign specific timeslots for portions of their data to be transmitted that are guaranteed to be free of any collisions. In some embodiments, the network's assignment of scheduled and random access data channels evolves dynamically as a function of network loading, observed trends, and local time. In some embodiments, the systems and networks disclosed herein enable one or more of 7 classes of service or network access modes: 1) near real-time, 2) store and forward, 3) on-demand reporting, 4) fixed interval transmission, 5) scheduled transmission, 6) emergency, and 7) always-on.

Disclosed herein, in some embodiments, are computer-implemented systems comprising: a digital processing device comprising: at least one processor, an operating system configured to perform executable instructions, a memory, and instructions executable by the digital processing device to create a network operations server (NOS) application for improving efficiency of a packet-switched communications network, the application configured to: receive data from a plurality of data source nodes; provide a management console allowing a user to configure a network multi-access protocol for: i) a node, ii) a type of node, iii) a group of nodes, iv) a type of data packet from a node, v) a type of data packet from a type of node, vi) a type of data packet from a group of nodes, and vii) a specific instance of a data packet from a node, the network multi-access protocol a scheduled access protocol or a random access protocol; and dynamically create channel assignments to allocate bandwidth of the network among channels based on the configured network multi-access protocols to prevent network saturation and minimize data collisions in the packet-switched network. In some embodiments, the application is further configured to coordinate with the data source nodes to provide a core set of network routing capabilities to enable a node, a type of node, or a group of nodes, to independently and dynamically route a type of data packet or a specific instance of a data packet through the network in response to the user configuration. In some embodiments, the plurality of data source nodes comprises a plurality of Internet-of-Things (IoT) data source nodes. In some embodiments, the plurality of data source nodes comprises at least 1,000, at least 10,000, at least 100,000, or at least 1,000,000 IoT data source nodes. In some embodiments, the communications network is bandwidth-constrained. In some embodiments, the scheduled access protocol is implemented as one or more of: store and forward; fixed interval transmission; and fixed schedule transmission. In some embodiments, the random access protocol is implemented as one or more of: near real-time priority; on-demand reporting; out-of-threshold or emergency transmission; and always-on dedicated channel. In some embodiments, the channel assignments are created and traffic is routed among channels further based on channel characteristics selected from: frequency, bandwidth, and modulation.

Disclosed herein, in some embodiments, are packet-switched communications networks comprising: a plurality of data source nodes; and a network operations server (NOS) receiving data from the nodes via a wireless link, the NOS configured to: provide a management console allowing a user to configure a network multi-access protocol for: i) a node, ii) a type of node, iii) a group of nodes, iv) a type of data packet from a node, v) a type of data packet from a type of node, vi) a type of data packet from a group of nodes, and vii) a specific instance of a data packet from a node, the network multi-access protocol a scheduled access protocol or a random access protocol; and dynamically create channel assignments to allocate bandwidth of the network among channels based on the configured network multi-access protocols to prevent network saturation and minimize data collisions in the packet-switched network. In some embodiments, the application is further configured to coordinate with the data source nodes to provide a core set of network routing capabilities to enable a node, a type of node, or a group of nodes, to independently and dynamically route a type of data packet or a specific instance of a data packet through the network in response to the user configuration. In some embodiments, the plurality of data source nodes comprises a plurality of Internet-of-Things (IoT) data source nodes. In some embodiments, the plurality of data source nodes comprises at least 1,000, at least 10,000, at least 100,000, or at least 1,000,000 IoT data source nodes. In some embodiments, the wireless link is a bandwidth-constrained backhaul link. In some embodiments, the scheduled access protocol is implemented as one or more of store and forward; fixed interval transmission; and fixed schedule transmission. In some embodiments, the random access protocol is implemented as one or more of: near real-time priority; on-demand reporting; out-of-threshold or emergency transmission; and always-on dedicated channel. In some embodiments, the channel assignments are created and traffic is routed among channels further based on channel characteristics selected from: frequency, bandwidth, and modulation.

Disclosed herein, in some embodiments, computer-implemented systems comprising: a digital processing device comprising: at least one processor, an operating system configured to perform executable instructions, a memory, and instructions executable by the digital processing device to create a network operations server (NOS) application for improving efficiency of a packet-switched communications network, the application configured to: receive data from a plurality of data source nodes, the plurality of data source nodes comprising: at least one human-operated node generating human-to-machine communications (H2M) and at least one machine-operated node generating machine-to-machine (M2M) communications; provide a management console allowing a user to configure a network multi-access protocol for: i) each human-operated node, ii) a group of human-operated nodes, iii) a type of data packet from the human-operated nodes, iv) a specific instance of a data packet from a human-operated node, v) each machine-operated node, vi) a group of machine-operated nodes, vii) a type of data packet from the machine-operated nodes, and viii) a specific instance of a data packet from a machine-operated node, the network multi-access protocol a scheduled access protocol or a random access protocol; and dynamically allocate network capacity among one or more channels that use random access protocols and one or more channels that use scheduled access protocols among the nodes to adjust for temporal requirements of the H2M communications and the M2M communications thus preventing network saturation and minimizing data collisions in the packet-switched communications network. In some embodiments, the application is further configured to coordinate with the data source nodes to provide a core set of network routing capabilities to enable a node, a type of node, or a group of nodes, to independently and dynamically route a type of data packet or a specific instance of a data packet through the network in response to the user configuration. In some embodiments, the plurality of data source nodes comprises at least 1,000, at least 10,000, at least 100,000, or at least 1,000,000 machine-operated data source nodes. In some embodiments, the communications network is capacity-constrained. In some embodiments, the scheduled access protocols are implemented as one or more of: store and forward; fixed interval transmission; and fixed schedule transmission. In some embodiments, the random access protocols are implemented as one or more of: near real-time priority; on-demand reporting; out-of-threshold or emergency; and always-on dedicated channel. In some embodiments, the network capacity is allocated among channels further based on channel characteristics selected from: frequency, bandwidth, and modulation.

Disclosed herein, in some embodiments, are packet-switched communications networks comprising: a plurality of data source nodes comprising: at least one human-operated node generating human-to-machine communications (H2M) and at least one machine-operated node generating machine-to-machine (M2M) communications; and a network operations server (NOS) receiving data from the nodes via a wireless link, the NOS configured to: provide a management console allowing a user to configure a network multi-access protocol for: i) each human-operated node, ii) a group of human-operated nodes, iii) a type of data packet from the human-operated nodes, iv) a specific instance of a data packet from a human-operated node, v) each machine-operated node, vi) a group of machine-operated nodes, vii) a type of data packet from the machine-operated nodes, and viii) a specific instance of a data packet from a machine-operated node, the network multi-access protocol a scheduled access protocol or a random access protocol; and dynamically allocate network capacity among one or more channels that use random access protocols and one or more channels that use scheduled access protocols among the nodes to adjust for temporal requirements of the H2M communications and the M2M communications thus preventing network saturation and minimizing data collisions in the packet-switched communications network. In some embodiments, the application is further configured to coordinate with the data source nodes to provide a core set of network routing capabilities to enable a node, a type of node, or a group of nodes, to independently and dynamically route a type of data packet or a specific instance of a data packet through the network in response to the user configuration. In some embodiments, the plurality of data source nodes comprises at least 1,000, at least 10,000, at least 100,000, or at least 1,000,000 machine-operated data source nodes. In some embodiments, the wireless link is a bandwidth-constrained backhaul link. In some embodiments, the scheduled access protocols are implemented as one or more of: store and forward; fixed interval transmission; and fixed schedule transmission. In some embodiments, the random access protocols are implemented as one or more of: near real-time priority; on-demand reporting; out-of-threshold or emergency transmission; and always-on dedicated channel. In some embodiments, the network capacity is allocated among channels further based on channel characteristics selected from: frequency, bandwidth, and modulation.

Disclosed herein, in some embodiments, are bandwidth-constrained communications networks comprising: a plurality of nodes and a network operations server (NOS); the nodes and the NOS configured to communicate bidirectionally using datagrams; the NOS configured to support at least one random access data channel and at least one scheduled multi-access data channel; the nodes configured to dynamically switch between the at least one random access data channel and the at least one scheduled multi-access data channel on a per packet basis to prevent network saturation and minimize data collisions.

Disclosed herein, in some embodiments, are communications networks comprising: a plurality of nodes and a centralized server; the centralized server configured to present a console allowing a user to define a plurality of network multi-access protocols and assign a network multi-access protocols to each node, wherein the plurality of network multi-access protocols comprises at least one protocol specifying data transmissions at predefined times and at least one protocol specifying data transmissions on an as needed basis; the centralized server further configured to manage communications across the network by issuing the assignments of the defined protocols to the nodes.

Disclosed herein, in some embodiments, capacity-constrained communications networks comprising: a plurality of nodes and a centralized server; the plurality of nodes comprising at least one human-operated node generating human-to-machine communications (H2M) and at least one machine-operated node generating machine-to-machine (M2M) communications; the centralized server configured to dynamically allocate network capacity between one or more random access data channels and one or more scheduled access data channels among the nodes to adjust for temporal requirements of the H2M communications and the M2M communications thus preventing network saturation and minimizing data collisions.

Overview

The present disclosure applies to making efficient use of a bandwidth-constrained communications channels used by many disparate devices. As the number of embedded devices with network connectivity requirements balloons with the introduction of smart cities, smart cars, and other data-driven systems, global network capacity and coverage need to increase to meet demand. One means of increasing network capacity for limited bandwidth communication systems is through the introduction of dynamic multi-access protocols, which allow data to be routed over channels with different multi-access protocols on a per connected device or per packet basis. A significant portion of the data transmitted over the internet of things (IoT) does not have strict responsiveness requirements due to the non-real-time nature of the data being transmitted. This type of data can be transmitted over highly efficient scheduled access data channels, where users can reserve specific transmission timeslots for their nodes. For data that require more immediate responsiveness, random access data channels are used. A centralized network operations server (NOS) provides an interface for users to make network access assignments for their devices or data; these assignments are managed and relayed to devices in the field by the central network operations server.

In some cases, the bottleneck in data packet-switched networks is the wireless data link and finite spectrum allocation, which needs to be utilized as efficiently as possible to mobilize data from the maximum possible number of devices over a finite number of channels. A typical network transmission involves datagrams of hundreds or thousands of bits exchanged between a device and a network operation server (NOS). The two may be in geographically distant locations, and each device is aware of its local time as well as a synchronized global time and location, e.g., UTC. To maximize efficiency of the wireless spectrum, the systems and devices herein enable connecting the devices and the NOS via two types of data channels, data channels using random access protocols, and data channels using scheduled access protocols. In some cases, data source nodes, devices, and sensors can dynamically route data between these two channels types as channel assignments are made from the NOS.

In some embodiments, network capacity or the wireless data link bandwidth is split between random access and scheduled data channels. In some embodiments, data packet traffic can be divided into two categories: packets that need to be transmitted at random or unpredictable times and packets that can be sent at either specific times or within specific time windows. In some cases, networks that deal with human interaction heavily rely upon random transmission data packets; however, Internet of Things (IoT) or M2M networks can present a significant amount of network traffic that can fall in the scheduled transmission category (e.g., sensors are pre-programmed to record and transmit data in fixed time intervals). To improve network efficiency and throughput, a scheduled access scheme is used when available, leveraging the fixed time interval of data gathering and transmission on devices.

In some embodiments, disclosed herein are systems and networks in which data can be routed through either near real-time or scheduled access data channels between data source nodes on the network and a central server as directed by the user. In some cases, data source nodes can dynamically switch between scheduled access and real-time data channels on a per packet basis. In some embodiments, the systems and networks herein support an adaptive multi-access protocol where data transmissions over the network can be routed on either a per-device basis, or on a per-packet basis. In some embodiments, all data source nodes synchronize and communicate with a central server which manages network data channel allocations. In some cases, the users can define if: all data from a node is transmitted on a fixed schedule, all data from a node is transmitted in real-time, or individual data packets are transmitted in real-time or on a fixed schedule. In some embodiments, users can define transmission schedules for nodes on the network, which the central server translates into scheduled access channel assignments.

Referring to FIG. 1, in particular embodiments, data source nodes 101, which optionally include IoT devices or sensors, generate data to be transported to the user's desired application(s) 102 or stored in the user's selected cloud storage 103. Data source nodes are connected to a co-located or remotely located hub 104, over a wired or wireless connection 105. In some embodiments, the hub aggregates data from multiple devices and transmits it through a data backhaul link 106 to a central network operations server (NOS) 107. From the NOS, the data is routed to the user's desired destination(s). In some embodiments, this data link is bidirectional, or in other words, data can also flow from the cloud storage or application(s) back to the data source nodes following the same route (NOS to hub, and hub to devices). In some embodiments, the bottleneck in this data communication process is the data backhaul link 106, since there is typically finite spectrum and bandwidth available to transport data. The systems and networks described herein efficiently widen this bottleneck and facilitate data communication across the greater number of devices with a limited bandwidth at the data backhaul link and/or any other data links within the systems and networks.

Certain Terms

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about," "near," or "approximately" refers to an amount that is near the stated amount by about 10%, 5%, or 1%, including increments therein.

In some cases, a user disclosed herein is a person or an entity that utilizes the systems, networks, and/or services herein for data transmission. In some cases, a user is an enterprise or industrial organization, a business organization, a government agency, an educational institute, a health service organization, a religious organization, a scientific organization, a military organization, an agricultural organization, a charitable organization, or a profit or non-profit organization. In some cases, a user is a business owner, a researcher, a farmer, an engineer, a health professional, a scientist, or any individual that utilizes the systems, networks, and/or services herein. In various suitable embodiments, the user owns, installs, and/or set parameters/preference of devices herein. In some embodiments, the user collects, reviews, monitors, manages, or otherwise utilizes the data that's transmitted to the user's application or to designated storage places of the user.

In some embodiments, the systems or network herein includes a wired or wireless connection, for example, 105, 106 in FIG. 1 that enables data communications among connected elements. Non-limiting examples of the data connection or communication mode includes: Ethernet, Wi-Fi, Bluetooth, Bluetooth LE, ZigBee, Near field communication (NFC), worldwide interope, Worldwide Interoperability for Microwave Access (WiMAX), LoRa, long-term evolution (LTE), cellular network signal, wireless local area networks (WLANs), wireless USB, ultra-wide-band, ultra-band, a microwave based connection, an infrared based connection, ultrasound-wave based connection, electromagnetic induction-based connection, or a sound-wave based connection. In some embodiments, the data connection or communication is via network cables. Non-limiting example of such cables include: twisted pair, phone-line, DSL, power line, USB, auxiliary, and fiber optic cables. In some embodiments, the systems or network herein includes a wired or wireless data link 106 that enables data communications among connected elements. In some embodiments, the data link is a satellite or terrestrial wireless link. In some embodiments, the data link is a data backhaul link. The backhaul link can be a fixed wireless link (e.g., fixed point-to-point terrestrial wireless link) or a mobile wireless link (e.g., mobile satellite service). In some embodiments, the connection herein is equivalent to a data link. In some embodiments, the data link includes one or more network channels.

In some embodiments, the user's application herein includes an application layer comprising the resulting information, insights, actions, and value that the users derive from their network of devices and data. In some embodiments, the user's application herein includes data analytics, data visualizations, data storages, data services, or data provision to third party consumers of data. Non-limiting examples of the user's application herein include: correlations between rain and soil moisture sensory data, visualization of speed of a wind turbine on a dashboard to monitor the wind turbine, recording digital payments from remote point-of-sale terminals, providing GPS data on an operator's truck to 3rd party insurance companies.

In some embodiments, the user's application disclosed herein includes a cloud-based storage. In some cases, the cloud storage includes servers on which data is stored or accessed over the Internet. In some embodiments, the servers are remotely located from the data source nodes, the user's application devices, hub, or NOS. In some cases, cloud storage can be owned by the user, or by a 3rd party service provider such as Amazon AWS or Microsoft Azure.

Data Source Nodes

In some embodiments, disclosed herein includes data source nodes. In some embodiments, the data source node is formed by a device, a digital processing device, or a sensor disclosed herein. In some embodiments, the data source node is equivalent to a device and/or a sensor herein. In some embodiments, the data source node is in the IoT. In some embodiments, the data source node includes one or more of: an IoT sensor, IoT actuator, IoT controller, and IoT effector. In some embodiments, the data source node may comprise one or more of the following components including a sensing component, or equivalently, a sensor (e.g., thermocouple), a wired or wireless data connection with a communications element (e.g. a radio transceiver with an antenna or connection for an external antenna), a microcontroller (MCU), a microprocessor (MPU), an electronic circuit connected to the sensing component, and an energy source. In some embodiments, a data source node includes one or more sensors (e.g., a data source node is a wearable device having a sensor). In some embodiments, one or more sensors of a data source node are physically separate from a device of the data source node. In further embodiments, the one or more sensors of the data source node authorize the device to obtain sensor data. In further embodiments, the one or more sensors provide or send sensor data to the device autonomously. In further embodiments, the one or more sensors provide or send sensor data to the device based on the control at the device. In some embodiment, the device of the data source node provides a gateway similar to a simple hub as described in FIG. 4.

In some embodiments, the communication element includes a receiver, a transmitter, and/or a transceiver. In some embodiments, the MCU or the MPU receives data from the sensing component or equivalent, the sensor, and transmit the data to the transmitter or transceiver to be transmitted to other remotely located elements within the network. In some embodiments, the receiver or transceiver receives data, for example, control data from remotely located devices, and such data gets relayed to the MCU or the MPU to generate commands to the sensing component. The sensing component performs one or more functions(s) based on the received command. In some embodiments, an electrical circuit utilized in data transfer among the sensing component, the MCU or MPU, and the communications element of the data source node.

In some embodiments, the IoT refers to the ever-growing network of physical devices, data source nodes, buildings, vehicles, sensors, and other objects for internet network connectivity for exchanging data. In many cases, IoT devices, data source nodes, or sensors are embedded with electronics, software, sensors, and network connectivity, etc. In some embodiments, IoT devices, data source nodes, or sensors feature an IP address for internet connectivity. In addition to an IP address, the IoT devices, data source nodes, or sensors may be associated with a MAC address or an SSID. It is understood that IoT devices, data source nodes, or sensors may connect with other devices through wired or wireless connections such as Ethernet, Bluetooth, Wi-Fi, LoRa, or any other technology, including those described herein, which allow for transfer of data.

In some embodiments, a device disclosed herein is a device in the IoT. In some embodiments, a device disclosed herein includes hardware that generates data, receives data or instructions to perform an action, or initiates a transaction. In some embodiments, the hardware is configured to perform an action based on instructions or received data, such as an irrigation pump that can be actuated based on an instruction or received data or a point of sale device that receives instructions and initiates a payment transaction. In some embodiments, the devices herein have a built-in or attached wired or wireless communications element to provide a data connection, such as Ethernet, Bluetooth, Wi-Fi, LoRa, or any other technology, including those described herein, which allow for transfer of data. In some embodiments, the device herein is configured to enable data communication via the communications element either in one direction or in both directions (i.e., transmission and receiving).

In various embodiments, the devices, sensors, or data source nodes herein includes one or more selected from: a homeland security device (e.g., a body scanner, metal detector, radiation detector, weapon, vehicle, perimeter intrusion detector, etc.), point-of-sale (PoS) system (e.g., a payment device, receipt printer, barcode or QR code scanner, etc.), smart city device (e.g., a parking meter, utility meter, lighting device, traffic monitoring camera, etc.), smart home device (e.g., a light, security system, appliance, thermostat, etc.), smart office device (e.g., a printer, coffee maker, etc.), smart manufacturing device (e.g., a robot, manufacturing actuator, assembly line sensor, etc.), health care device (e.g., a drug infusion pump, pacemaker, defibrillator, patient health monitoring device, etc.), freight or shipping asset (e.g., a shipping container, cargo, truck, rail car, watercraft, aircraft, etc.), transportation asset (e.g., a car, truck, watercraft, train, bus, aircraft, etc.), transportation telemetry device, environmental sensor (e.g., a carbon dioxide sensor, pollution detector, salinity meter, etc.), weather sensor (e.g., humidity sensor, temperature sensor, rain gauge, etc.), agriculture device (e.g., a farming machine, soil sensor, irrigation device, etc.), fishing vessel, utility device (e.g., a water meter, transformer, gas meter, etc.), pipeline monitoring device, power plant monitoring device, electrical grid monitoring device, and emergency calling device.

In some embodiments, the devices, sensors, or data source nodes herein include a sensing component, MCU, MPU, an electrical circuit, a software module, an application, and/or the like that monitors functionalities, controls functionalities, and/or tracks location and status of the devices, sensors, or data source nodes herein. In some embodiments, the sensing component, MCU, MPU, an electrical circuit, a software module, an application, and/or the like are embedded in the devices, sensors, or data source nodes. In some embodiments, data are generated based on the monitoring, controlling, and/or tracking of the devices, sensors, or data source nodes. For example, data are generated for the real-time location of a container based on a GPS sensor thereon. As another example, data are generated based on battery level of a pacemaker. In some embodiments, data are generated from the sensing component sensing factors external to the devices, sensors, or data source nodes. As an example, humidity data are generated from a humidity sensor.

In some cases, the hardware of the device herein includes a sensor. In some embodiments, a sensor herein is one of a GPS sensor, a Wi-Fi transceiver, a cellular transceiver, and a Bluetooth transceiver. In some embodiments, a sensor and/or sensor device comprises an acoustic sensor, a breathalyzer, a temperature sensor, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, an inertial sensor, a gyroscope, or any combination thereof, and in some embodiments, sensor data comprises information obtained from any of the preceding sensors. Other examples of sensors may include but are not limited to location sensors, vision sensors (e.g., imaging devices capable of detecting visible, infrared, or ultraviolet light, such as cameras), proximity sensors (e.g., ultrasonic sensors, LIDAR, time-of-flight cameras), inertial sensors (e.g., accelerometers, gyroscopes, inertial measurement units (IMUs)), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

In some embodiments, the devices, sensors, or data source node herein is in a network. In some embodiments, the data source node, devices, sensors herein is in a data packet-switched network, IoT network, or any other type of networks that allows data packet switches among nodes therewithin. Non-limiting examples of the network herein include IoT networks, wireless sensor networks (WSN), and wireless sensor and actuator networks (WSAN). In some embodiments, the network is a Wi-Fi, WiMAX, or LTE MESH network. The network may include a central node for controlling the network. In some embodiments, the network has a distributed architecture to reduce the impact of a failed node.

In some embodiments, the type of the node may be based on the type of the sensor, the type of the device, the type of the data packets collected from the node, a geolocation of the node, a function of the node, a user's setting, or any other property or parameters of the node.

In some embodiments, the plurality of data source nodes disclosed herein comprises at least 1,000, at least 10,000, at least 100,000, at least 1,000,000, at least 1,000,000,000, or at least 1,000,000,000,000 machine-operated data source nodes. In some embodiments, the plurality of data source nodes disclosed herein comprises at least 1,000, at least 10,000, at least 100,000, or at least 1,000,000, at least 1,000,000,000, or at least 1,000,000,000,000 human-operated data source nodes. In some embodiments, the systems and networks disclosed herein include from about 100 to about 100 trillion data source nodes. In some embodiments, the systems and networks disclosed herein include from about 100,000 to about 100 billion data source nodes. In some embodiments, the systems and networks disclosed herein include at least 100,000, at least 200,000, at least 300,000, at least 400,000, at least 500,000, at least 600,000, at least 700,000, at least 800,000, at least 900,000, at least 1,000,000, at least 2,000,000, at least 3,000,000, at least 4,000,000, at least 5,000,000, at least 6,000,000, at least 7,000,000, at least 8,000,000, at least 9,000,000, at least 1 million, at least 10 million, at least 20 million, at least 30 million, at least 40 million, at least 50 million, at least 60 million, at least 70 million, at least 80 million, at least 90 million, at least 100 million, at least 200 million, at least 300 million, at least 400 million, at least 500 million, at least 600 million, at least 700 million, at least 800 million, at least 900 million, at least 1 billion, at least 10 billion, at least 20 billion, at least 30 billion, at least 40 billion, at least 50 billion, at least 60 billion, at least 70 billion, at least 80 billion, at least 90 billion, at least 100 billion, at least 200 billion, at least 300 billion, at least 400 billion, at least 500 billion, at least 600 billion, at least 700 billion, at least 800 billion, at least 900 billion, at least 1 trillion, at least 10 trillion, at least 20 trillion, at least 30 trillion, at least 40 trillion, at least 50 trillion, at least 60 trillion, at least 70 trillion, at least 80 trillion, at least 90 trillion, at least 100 trillion or more, data source nodes, including increments therein.

Management Console

In some embodiments, the systems and networks disclosed herein include a management console. In some embodiments, the management console includes one or more processors, a persistent data store, a memory, a user interface, one or more software modules, a web application, a mobile application, a computer-readable medium, a wired or wireless connection, a communications element, and a power source. In some embodiments, the communications element includes a transmitter, a receiver, and/or a transceiver. In some cases, the management console includes a digital processing device, a processor, or the like. In some embodiments, the management console is connected to the Internet. In some embodiments, the management console is connected to the networks and systems disclosed herein thus, the elements therewithin.

In some embodiments, the management console herein is provided at a NOS or a hub. In some embodiments, the management console is accessible by the user using a digital processing device remotely from the NOS and/or the hub. In some embodiments, the management console is accessible by the user using a digital processing device connected to the NOS or the hub via a wired or wireless connection. In various embodiments, the management console is accessible from any suitable computing device connected to any network providing access to the web.

In some embodiments, the management console allows the user to perform one or more of: creating a user account, logging into a user account, creating or edit a user profile, registering one or more devices (e.g., data source nodes, hubs, and/or NOSs), selecting one or more devices (e.g., data source nodes, hubs, and/or NOSs), and managing one or more devices (e.g., data source nodes, hubs, and/or NOSs). In some embodiments, the management console provides information pertaining to the one or more data source nodes, hubs, and/or NOSs selected by the user. In some embodiments, the management console allows the user to edit parameters of the one or more data source nodes, hubs, and/or NOSs.

In some embodiments, the management console herein further allows a user to configure one or more access protocols. For instances, the user may define, review, edit, save, copy, monitor, or manage one or more access protocols. In some cases, the access protocol(s) are assigned for one or more data source nodes, one or more types of data source nodes, one or more data packets, and/or one or more types of data packets from one or more data source nodes. In some cases, the access protocol(s) are assigned for one or more human-operated or machine-operated nodes, one or more data packets from the human-operated or machine operated nodes. In some embodiments, the node(s) or data packets may be of one or more types. In some embodiments, the access protocol is a scheduled access protocol and/or a random access protocol. By way of example, a farmer has a temperature sensor in his farm and a video camera installed in his baby's room. He logs into the management console and selects two different access protocols, one for his temperature sensor and the other for the video camera. More specifically, he selects a near real-time access protocol for live streaming from his video camera to his mobile device during 6 pm-7 am when his baby is in his room and daily read of his temperature sensor to his desktop only during winter when cold temperature may cause damage to his crops. He also selects a "smart hub" mode which enables usage of a hub application platform interface (API) for his data services.

Scheduled and Random Access Protocols

In some embodiments, the systems and networks disclosed herein include different network access protocols. In some embodiments, the network access protocols comprise a set of specific rules for elements (e.g., devices, nodes, sensors, etc) within the network/system to communicate data and share the network channels. In some embodiments, the network access protocols are equivalent to the network access modes described herein.

In some embodiments, the systems and networks disclosed herein advantageously allow a network to deterministically allocate channels to devices that are pre-scheduled, since the network has knowledge of when devices need to transmit data. In some embodiments, such knowledge of need for data transmission from the devices enables different access protocols or network transmission modes that a user can choose from. In some cases, the different access protocols herein include a scheduled access protocol, and a random access protocol, or equivalently herein, a spontaneously access protocol. In some embodiments, a network channel is an information route that utilizes at least a portion of the network's bandwidth to transfer data. In some embodiments, a network channel is non-overlapping with any other channels. In some embodiments, the network channels can overlap with one or more other channels.

In some cases, data channels using a scheduled access protocol provide an extremely efficient data pipeline to transmit large amounts of data that does not have strict responsiveness requirements. In some cases, each data channel assigned for scheduled transmissions is divided into timeslots representing the amount of time required to send one data packet. In some cases, the time slots may vary depending on the size of the data, the number of the data packets or the need of the user. In some cases, each specific time slot is made available for users to assign to one or more of their nodes, one or more types of their nodes, one or more data packets, or one or more types of data packets. Users can make exact time assignments, or assignments within variable sized time windows, where the exact time slot is selected by the NOS or the hub. In some embodiments, once a channel time slot has been assigned to a specific node, it is no longer available for other users. Time slots can be assigned on a singular or a recurring basis. In some embodiments, any transmissions that occur over a scheduled time slot are then guaranteed to be collision free. Network bandwidth is finite, and this scheme, in some cases, puts a limit on the network capacity for scheduled transmissions and provides a means of minimizing collisions.

For more traditional network packet data, each node maintains locally its current random access channel assignment for any data that requires immediate transmission over the network. In some embodiments, random access channel assignments are actively managed by the NOS to reduce network saturation on heavily occupied channels. For example, if a random access channel has reached a threshold capacity, e.g., 85%, some of the data nodes using this channel may be re-assigned to less saturated channel(s) by the NOS. Such assignment and re-assignment may occur in real-time. In some embodiments, transmissions that collide or are otherwise unsuccessful are re-sent over the network using a random access protocol regardless of the protocol they were assigned for the initial transmission. If a transmission over a scheduled data channel fails, it may be re-sent over the random access channel.

In some embodiments, the channel assignment and data routing functionality of a node can be collocated with the data creation devices, data source nodes, or sensor or it can be stored in a separate device (a hub) which aggregates data from multiple connected devices.

Near Real-Time Mode (NRT):

In some cases, the different access protocols herein include a Near Real-time (NRT), or immediate priority mode. With this mode, services can spontaneously/randomly transmit data on the network. Data with immediate priority is suitable for transmission in this mode. Non-limiting examples of such data include digital payments transactions, alert messages, error messages, alarm triggers, target detections, authorizations, or the like.

Store and Forward Mode:

In some cases, the different access protocols herein include a Store and Forward mode. Under this mode, the hub or devices cache data locally, which is then transmitted or backhauled over the network on a fixed schedule. Non-limiting examples of data suitable for transmission in this mode include hourly weather data dump, daily temperature updates, hourly water level updates.

On-Demand Reporting Mode:

In some cases, the different access protocols herein include On-demand Reporting mode: With this mode, the user can choose to manually retrieve data from devices, wherein the network calls or fetches data from devices. Non-limiting examples of data suitable for transmission in this mode include fetching oil pressure values from valves during a safety audit, reading water levels during a high tide. In some cases, users can also choose to create 'if this, then that' type of constructs for fetching data. For example, the user may choose to fetch data from soil moisture sensors if the weather service indicates rainfall.

Fixed Interval Transmission Mode:

In some cases, the different access protocols herein include Fixed Interval Transmission mode. In this mode, devices can be programmed to transmit data on a fixed time interval. Non-limiting examples of data suitable for transmission in this mode include a GPS sensor on a truck transmitting its location data once every minute.

Scheduled Transmission Mode:

In some cases, the different access protocols herein include Scheduled Transmission mode. With this mode, devices can be programmed to transmit data on a fixed schedule, where the network is aware of such schedule. For example, a user schedules solar radiance sensors to read and transmit data every day at 12 pm.

Emergency or Out-of-Threshold Mode:

In some cases, the different access protocols herein include Emergency or Out-of-Threshold mode. With this mode, devices can be programmed to transmit on a data uplink channel or an emergency channel on the network, if triggered by an Out-of-Threshold value on a sensor linked to the device. For examples, if carbon monoxide level reading is higher than threshold, the device connected to the carbon monoxide sensor transmits an alarm or emergency flag to make the user or user's application aware.

Always on (Dedicated Channel) Mode:

In some cases, the different access protocols herein include Always on (dedicated channel) mode. In some cases, some users may demand dedicated channels on the network, if they have sensors that require a constant stream of data back and forth between devices and the NOS. For example, a user may request a dedicated always-on channel for data transmission between an unmanned camera and a video streaming application.

Figure 3:
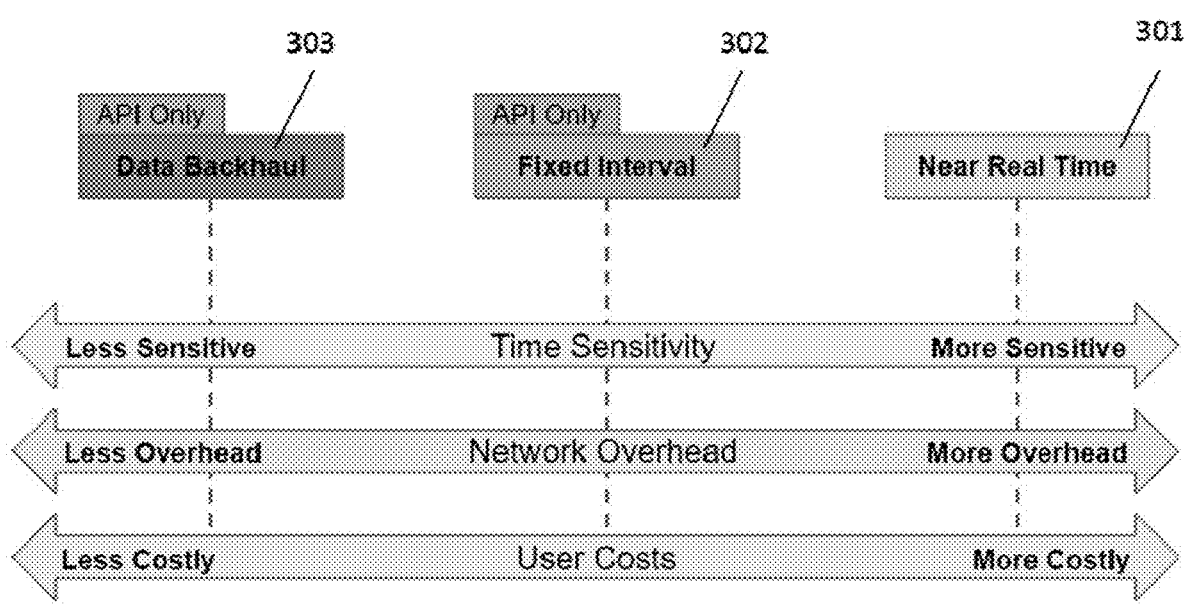
FIG. 3 shows a non-limiting schematic diagram of the systems and networks disclosed herein; in this case, three transmission capabilities, near real-time mode, fixed interval mode, and data backhaul transmission mode utilized in the systems and networks disclosed herein.

In some embodiments, the systems and networks herein balance efficiency and capability with simplicity and ease of use. For instance, the systems and networks offer different levels of data uplink transmission depending upon the time sensitivity of that data that is being sent. Referring to FIG. 3, in particular embodiments, such different levels include near real-time transmissions (NRT) 301, fixed interval transmissions (FIT) 302, and data backhaul 303. These three data transmission modes represent a spectrum of capabilities and present shared value propositions that are consistent between both the user and network provider while also managing user expectations.

In some embodiments, near real-time mode provides a transmission mode for customers that are either very sensitive to the transmission time of their data, or customers that do not want to take on any additional overhead for interacting with the network. In some cases, this mode is available with and without the usage of the hub API. In some embodiments, typical users for this mode might be time sensitive transactions such as payment processing, or users without the technical capacity to interface with the hub API. In some embodiments, the near real-time mode allows a data transmission with a delay of less than 1 second, less than 0.5 second, or less than 0.2 second.

In some embodiments, the FIT mode allows customers who are less sensitive about the arrival time of their data to still get their data in a regular fashion. In some cases, hubs have the capacity to send fixed amounts of data at regular time intervals. In some cases, such regular time interval is about 15 minutes. In various embodiments, the regular time interval is any duration between 1 minute and 24 hours. In some cases, data to be sent via a fixed interval transmission is sent through the hub API, where it is stored in a specified cache, optionally in the FIT-cache, until it is ready to be transmitted. In some cases, data stored in the cache can be sorted according to priorities set when sending the data through the hub API, such that more important data can jump the queue and be the first in line to be transmitted.

In some embodiments, data backhaul (DBH) transmissions service customers who have sensors that aggregate data over long periods of time. These customers may not be sensitive to the retrieval time of their data. In some cases, sensors transmit data to the hub through the hub API, where it is stored in the DBH-cache until it is ready to be transmitted. In some cases, the memory on the hub is referred to as the data backhaul cache (DBH-cache); a subset of the DBH-cache is the FIT-cache, which is reserved for transmissions over the fixed interval data channel. In some embodiments, data are stored to be transmitted every 24 hours, or at a predefined capacity. In some embodiments, the network schedules a dedicated timeslot for the hub to upload its data. For example, the user may select to upload his data every day or when data reaches 1 megabyte (MB), whichever comes first. The network may schedule a dedicated timeslot within a time of day when the network is less crowded, or find a timeslot within 1 hour of the notification that the data has reached 1 MB for data transmission. In some embodiments, during non-business hours, the amount of network capacity allocated towards data backhaul transmissions can be increased to allow for large amounts of aggregated data to be uploaded at night. In some cases, data stored in the DBH-cache, can be sorted according to priorities set when sending the data through the hub API, such that more important data can jump the queue and be the first in line to be transmitted.

In some cases, all data sent through the hub API for transmission over data backhaul or fixed interval services is stored in local memory on the hub until a transmission window becomes available. In some embodiments, the DBH-cache is about 8 MB in size, which corresponds to approximately 1 hour of continuous transmission at 20 kbps. In some embodiments, the FIT-cache is about 8 MB in size. In some embodiments, the DBH-cache or the FIT-cache is about 1 MB to about 1024 MB in size.

In some embodiments, the memory on the hub further includes the PULL-cache which is a circular data buffer for indefinite storage until a user requests it to be transmitted. In some embodiments, the PULL-cache is a circular data buffer that retains the latest data sent to the cache. In some embodiments, users can request the data in the PULL-cache and have it sent over the real-time data channel. In some embodiments, the user pull transmission mechanism allows users an option to only receive data when they request it. Data transmitted over the API is stored in a priority sorted fashion in the PULL-cache until transmission occurs. In some embodiments, the PULL-cache is about 1 kB to about 1024 MB in size.

Figure 4:
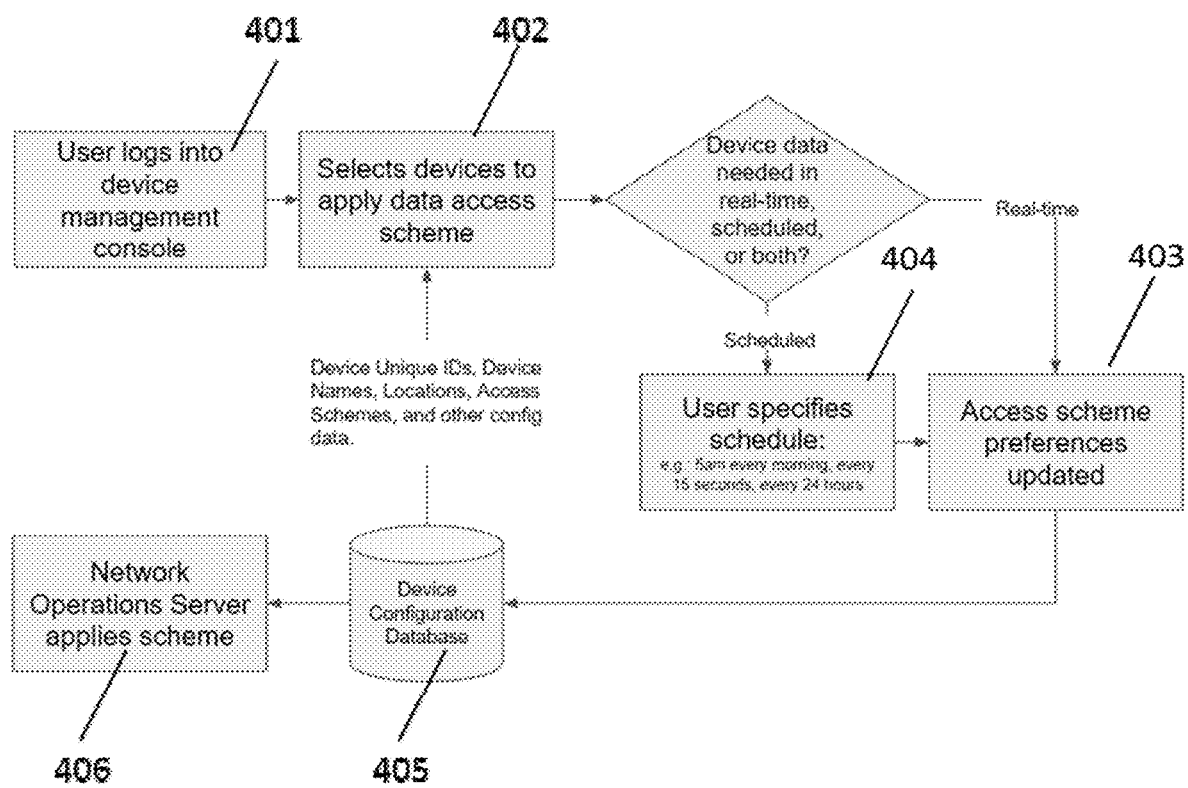
FIG. 4 shows a non-limiting schematic diagram of the systems and networks disclosed herein; in this case, user defined data access scheme(s) for devices in the systems and networks disclosed herein.

Referring to FIG. 4, in particular embodiments, users are allowed to specify the data access schedule(s), based on which the networks and systems retrieves data from hubs, so that the NOS knows when to assign transmission channels for hubs to offload aggregated device data. In some embodiments, the users can specify the schedule(s) through an online management console. In these particular embodiments, the users log into their individual management console 401 to view the list of hubs and data source nodes associated with their account. In some cases, the user selects data source node(s) to apply different data schemes 402. For each hub, data retrieval schedules or schemes can be assigned. If the data from source nodes are needed in real-time, the user may update access scheme preferences accordingly 403. Alternatively, if the data are needed with a schedule, the user can specify schedules 404. The user may assign an instantaneous access scheme to one or more hubs, where all data sent to the hub(s) is immediately sent to the NOS over the backhaul network. The user may alternatively assign a scheduled access scheme to one or more hubs, where a user then selects the recurring time frame/frames they would like the hub to transmit any accrued data (e.g., 5 am every morning, or once every 10 seconds). In some embodiments, for hubs assigned a scheduled access scheme, there is an option to enable instantaneous transmission for: a) specific data source nodes connected to the hub, as when they transmit data to the hub, or b) specific data packets from one or more data source nodes (e.g., if temperature value exceeds a certain value, then instantly transmit data to the NOS instead of letting the hub aggregate additional data). Once these preferences are set they are stored in a device configuration database 405 and implemented by the NOS 406.

In some embodiments, the scheduled access protocol comprises one or more of: store and forward; fixed interval transmission; and fixed schedule transmission. In some embodiments, the random access protocol comprises one or more of: near real-time immediate priority; on-demand reporting; out-of-threshold; and always-on dedicated channel.

Channel Assignments

In some embodiments, the network channelization to support the data transmission modes disclosed herein includes multiple network channels. In some embodiments, the network or channel herein includes a bandwidth, or a data capacity indicating how much data may be transmitted per unit time. In some embodiments, each channel is assigned to provide one or more type of network access modes. In some embodiments, one or more channels are assigned to one type of network access modes dependent on the traffic.

In some embodiments, the channel assignment is dynamically controlled at the NOS, optionally via a NOS application, software, or the like.

In some cases, the network channels herein includes one or more types and the types include a data uplink channel, data downlink channel, uplink control channel, downlink control channel, network registration and telemetry channel, and emergency channel. In a particular embodiment, the network channels include three data uplink channels, at least one data downlink channel, one uplink control channel, one downlink control channel, one network registration and telemetry channel, one emergency channel for data downlink, and one emergency channel for data uplink.

In some embodiments, the nodes/devices/sensors are assigned one or more data uplink channels based on the data type, the type of nodes/devices/sensors, and the priority of the data, and sensitivity to transmission time. In some cases, a data uplink channel is used for near real-time (NRT) transmission mode. In some cases, a data uplink channel is used only for near real-time (NRT) transmission mode. In some cases, a data uplink channel is a Slotted Aloha channel. In some case, data is sent over the backhaul network within a static guaranteed timeframe, for example in less than 1 second to 5 seconds that is independent of any device or hub specific configurations. In some cases, near real-time (NRT) transmission mode is the standard Internet connection mode. In some cases, the NRT mode is available with or without the use of the hub API. In some cases, user application sessions which utilizes data transmitted in NRT mode can originate at either the sensor/device/node, or be proxied at the hub if data is sent through the hub API, be proxied at a remote digital processing device of the user.

In some cases, a data uplink channel is used for priority enabled fixed-interval transmission (FIT) mode. In some cases, a data uplink channel is used only for priority enabled fixed-interval transmission (FIT) mode. In some cases, such data uplink channel is a scheduled data uplink channel. For instances, at a regular interval, the hub is polled by the NOS over the FIT-Control channel on its current FIT-cache and DBH-cache statuses. In some cases, if data exists in the FIT-cache, or if the DBH-cache is within a preselected capacity, the hub responds over the FIT-Control channel with a data packet. In some cases, the preselected capacity may be in the range of about 50% to about 95% of the full capacity. In some cases, the data packet is a 3-datum packet. In further cases, the data packet includes a hub ID, a Boolean indicator of whether FIT-cache data exists, and a Boolean indicator of whether DBH-cache is at capacity or not. For instances when no data exists in the FIT-cache and the DBH-cache is not at capacity, no response is given by the hub over the FIT-Control channel. In some cases, if FIT-cache data needs to be transmitted, the NOS schedules a transmission time as soon as possible over the FIT data channel. If the DBH-cache is at capacity, the NOS schedules an upload time within a pre-specified time period, for example, within the next 24 hours, over the DBH data channel and flags the hub to no longer respond with DBH-cache at capacity flags until after its next DBH data channel assignment. Data stored in the FIT-cache can adhere to a priority scheme, where higher priority data is moved to the front of the FIT data channel transmission queue. This mode is only available through the hub API, and all user application sessions utilizing data transmitted in FIT mode originate at the hub, or are proxied at a remote digital processing device of the user.

In some cases, a data uplink channel is used for priority enabled Data Backhaul (DBH) mode. In some cases, a data uplink channel is used only for priority enabled Data Backhaul (DBH) mode. In some cases, such data uplink channel is a scheduled data uplink channel. In some cases, data backhaul is used for transmitting large amounts of data with minimal time-sensitivity. On regular basis, for example once every 24 hours, the hub sends a flag to the NOS over the FIT-Control channel requesting a DBH data channel scheduling assignment. In some cases, the NOS provides an upload time slot in the next repeated time period, for example, within the next 24 hours. In some embodiments, data backhaul requests occur automatically on a regular basis, for example, once in every 24 hours, or when the hub reaches a predefined capacity. In some cases, the data backhaul service is limited to only 1 call within a time period, optionally within 24 hours. During the hub's scheduled time slot, in some cases, the hub transmits all data in the DBH-cache including the FIT-cache over the DBH data channel. In some cases, users may transmit their data via the hub API. In some cases, the users additionally can have the option to pre-schedule DBH transmissions allowing them to have guaranteed consistent upload schedule transmission assignments. In some cases, data transmitted over the API is stored in a priority sorted fashion in the DBH-cache until transmission occurs. For this mode all user application sessions originate at the hub, or are proxied at a remote digital processing device of the user.

In some cases, a data downlink channel is used for priority enabled near real-time mode. In some cases, a data downlink channel is a scheduled transmission channel. In some embodiments, requests for data downlink are sent through the NOS. In some cases, the NOS queues all downlink data packets and queues them up for transmission over the network utilizing a hub priority scheme, where data sent to high priority hubs is placed in the front of the queue.

In some cases, an uplink control channel herein is a FIT-Control channel. In some cases, an uplink control channel or the FIT-Control channel herein is a Slotted Aloha channel. In some cases, hubs request access on the FIT and DBH data uplink or downlink channels by responding with an affirmative to the data query presented by the hub scheduling downlink channel. In some embodiments, the uplink control channel utilizes oversubscription for usage of the channel.

In some cases, a hub registration/telemetry channel is a slotted Aloha channel. In some cases, a hub registration/telemetry channel is for managing hub registration and access.

In some cases, an emergency uplink channel is a Slotted Aloha channel. In some cases, the emergency uplink channel is used for providing excess capacity reserved for emergency transmissions.

In some cases, a downlink control channel herein includes a hub scheduling downlink channel. In some cases, a hub scheduling downlink channel is a scheduled transmission channel. In some cases, a broadcast message is sent out to all hubs over the hub scheduling downlink channel, allocating them a timeslot on the FIT-control uplink channel to indicate if they have data to send.

In some cases, a downlink control channel herein includes a hub registration/telemetry channel. In some cases, the hub registration/telemetry channel is a Slotted Aloha channel. In some cases, the hub registration/telemetry channel is for managing hub registration and access.

In some cases, an emergency downlink channel is a Slotted Aloha channel. In some cases, the emergency downlink channel is used for providing excess capacity reserved for emergency transmissions.

Figure 2:
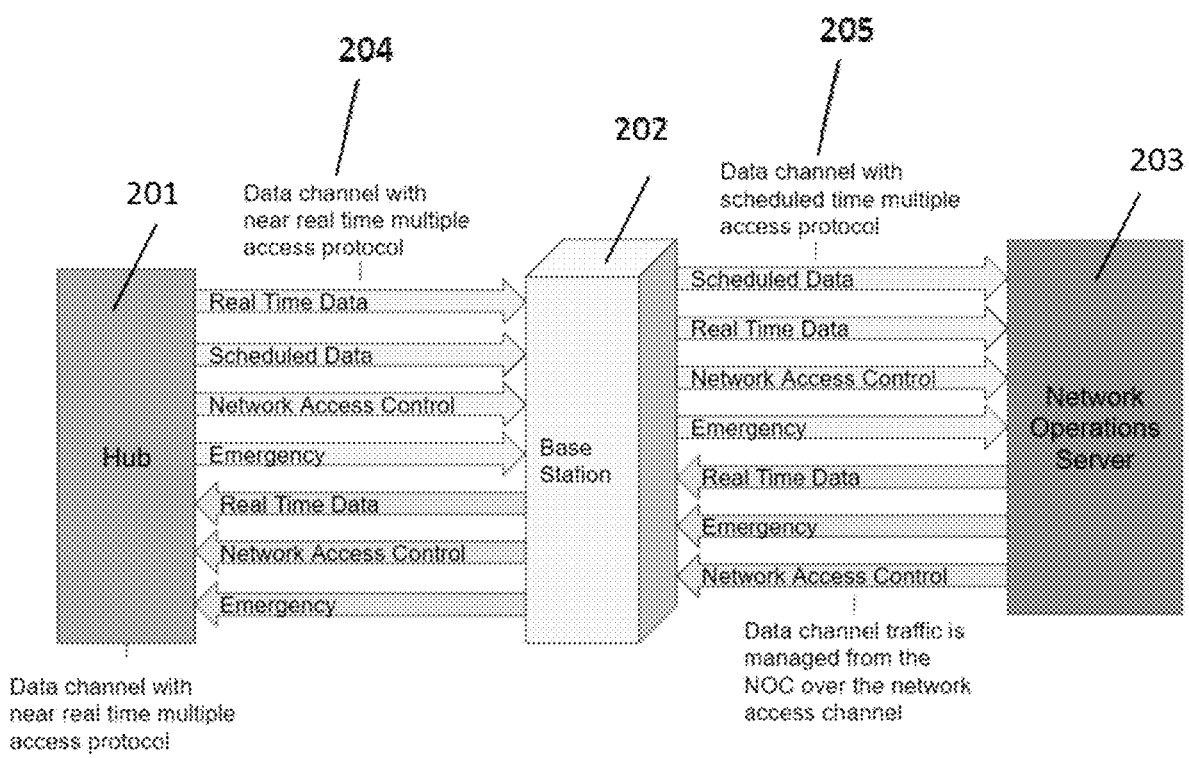
FIG. 2 shows a non-limiting exemplary embodiment of the systems and networks herein; in this case, data communications between a hub and a NOS with a relay between the hub and the NOS.

Referring to FIG. 2, in particular embodiments, the hub 201 communicates with the NOS 203 over a bandwidth-constrained wireless backhaul link, which could have a base station 202 or relay as a bridge between the hub and the NOS. This base station could be, for instance, a terrestrial base station or relay (signal repeater), or a satellite system which relays received signals between the hub and the NOS. In some cases, the wireless spectrum of the backhaul link is typically partitioned into channels 204, 205 or separate frequencies that carry data. The available bandwidth in the limited bandwidth data backhaul link is partitioned into channels for different uses. In some cases, such channels include one or more scheduled access data channels which are allocated for data from one or more hubs and is retrieved by the NOS on a fixed schedule. In some cases, such channels include real-time access data channels which are allocated for traffic that needs to be instantaneously transmitted from the hub when received from the hub's associated devices/nodes. In some cases, such channels also include an access control channel allocated for traffic management—e.g., providing hubs a channel and time slot to transmit data, an emergency channel allocated to provide devices/nodes and hubs a channel that's always available to transmit high priority messages (e.g., device stolen, emergency location beacon, etc.).

Dynamic Allocation

In some embodiments, allocation of network capacity between scheduled and random access protocols is actively managed, optionally at the NOS, via a NOS application. In some embodiments, the channel capacity for each channel is actively managed accordingly. In some embodiments, the capacity for one or more channels may be actively altered. In some embodiments, the number for scheduled and for random access channels may be altered with or without the change of channel capacity.

In some embodiments, during business hours in which humans are active, human-to-machine (H2M) traffic, which includes random access traffic, increases. To support the increase in H2M traffic, additional network capacity may be allocated towards random access protocols. As H2M traffic decreases during nighttime hours, M2M traffic can be prioritized and additional network capacity can be allocated for scheduled multi-access protocols. In some embodiments, a remote data logger that needs to send its accumulated data once per day can do so at night as the application(s) that use its data are not overly sensitive to when the collected data is sent. Assuming a 08:00 h-20:00 h workday M-F, an exemplary network capacity allocation schedule is presented in Table 1, where random access capacity is increased during times in which human activity is high, and scheduled access is increased when human activity is low.

TABLE 1

| Day | Local Time | Random Access Capacity | Scheduled Access Capacity |
| --- | --- | --- | --- |
| Mon | 08:00-20:00 | 70% | 30% |
|  | 20:00-08:00 | 40% | 60% |
| Tue | 08:00-20:00 | 70% | 30% |
|  | 20:00-08:00 | 40% | 60% |
| Wed | 08:00-20:00 | 70% | 30% |
|  | 20:00-08:00 | 40% | 60% |
| Thu | 08:00-20:00 | 70% | 30% |
|  | 20:00-08:00 | 40% | 60% |
| Fri | 08:00-20:00 | 70% | 30% |
|  | 20:00-08:00 | 40% | 60% |
| Sat | 08:00-22:00 | 60% | 40% |
|  | 20:00-08:00 | 40% | 60% |
| Sun | 08:00-22:00 | 60% | 40% |
|  | 20:00-08:00 | 40% | 60% |

Because the Earth has distinct time zones, the network provisioning scheme may need to take local time into account. In some embodiments, nodes that have GPS receivers can infer the local time, and apply it to their current multi-access protocol settings. In some embodiments, in a spatially segmented network architecture (e.g., one that uses spot beams from a geostationary satellite to cover a particular landmass) the network can target nodes in a particular time zone or zones for access scheduling, obviating the need for a GPS receiver (or any other real-time clock and positional information source) on the node itself. Thus, a global network that is both temporally and spatially segmented, can apply dynamic multi-access diurnal scheduling to the worldwide network using a minimum of bandwidth, thus shaping the transaction load and optimizing bandwidth utilization.

In some embodiments, allocation of network capacity between scheduled and random access protocols is dynamically managed, optionally at the NOS. In some cases, the dynamic allocation is automatically performed via an algorithm or software. In some embodiments, such dynamic management may be based on information of previous channel allocations, information of previous channel collision or congestion. In some embodiments, the dynamic allocation may be based on information of current channel allocation, information of current channel collision or congestion. In some embodiments, the algorithm or software includes empirical information, statistical information. In some embodiments, the algorithm or software includes mathematical operations, artificial intelligence, machine learning, neural networks, or the like.

For example, if channel collisions or congestions are detected to be beyond a threshold in the random access channels but not the scheduled access channels on a Monday at 19:00 pm, local time, the percentage of random access capacity may be increased by a pre-selected increment, for example, by 5%, to be at 75%. If channel collision or congestion is detected again at 19:15 pm, the percentage of random access capacity may be increased using a pre-selected increment schedule, for example, by 3%, to be at 78%, until the collision or congestion level falls below the threshold. As another example, statistical analysis of previous channel allocation information shows 78% of random access capacity maintains the network's congestion occurrence rate below a threshold on weekdays, thus, 78% may be assigned to random access channels.

Hub

In some embodiments, a hub, or equivalently, a gateway, disclosed herein includes a local aggregator of device data which serves to forward data from devices to a Network Operations Server (NOS). In some embodiments, data forwarding from the hub to the NOS is over a data backhaul link. In some embodiments, the hub herein also serves to transmit data from the NOS back to the devices.

In some cases, the hub enables the following for user's devices: providing a wireless/wired interface for communicating data; aggregating and locally caching data from devices; receiving and following commands from NOS on when and/or how to transmit data over a network channel disclosed herein; transmitting cached data over a data backhaul medium.

In some embodiments, the hub includes a hub application programming interface (API). In some cases, the data source nodes, devices, and/or sensors interact with hubs using the API, through a wireless or wired connection. The API allows users to specify the data payload they would like to transmit from their devices, and any additional data configuration parameters, such as data transmission preference and data aggregation preferences, destination, priority. In some embodiments, the data is processed based on data packet configuration parameters, user preferences or other data processing parameter at the hub.

In some embodiments, the channel assignment and data routing functionality of a node can be collocated with the data creation devices, data source nodes, or sensor or it can be stored in a separate device (a hub) which aggregates data from multiple connected devices. In some cases, a hub presents a local physical layer network interface such as Ethernet, Bluetooth, Wi-Fi, LoRa, or any other technology, including those described herein, which allow for connection to multiple local devices. Since the hub may manage network access, the connected devices or data source nodes may no longer require any specialized network access infrastructure, and are agnostic to any data routing decisions made on the hub. In some cases, data that is routed through the hub for real-time transmission is immediately routed onward, while data tagged for scheduled transmissions are timestamped and stored in a local cache on the hub until the hub's scheduled transmission window arrives. When multiple devices/nodes/sensors connect to a hub, data can be routed using per hub, per device/node/sensor, or per data packet rulesets. In some embodiments, users can define per hub data routing rulesets through an online management console, and can augment data routing functionality through interfacing with a local hub API to process and route data on a per packet basis.

In some embodiments, device-gathered data may be recorded by making calls from the device to the RESTful API, e.g., a Representational State Transfer (REST)-compliant web service, hosted by the hub. A single API call may contain a single datum or a batched data set. API calls with new data may contain nothing more than the device id and data, or they may contain custom data-handling instructions alongside the data. If they contain any custom instructions alongside the data itself, those instructions take priority over any pre-set instructions for that device, hub, or customer, for all data contained on that specific API call. As an example, an API call can be as simple as:

POST https://192.168.0.1/api/data
Body: {'device':'DEVICE_ID','data':['12345']}

The body may optionally also contain any or all of the following parameters: priority: EMERGENCY if the data needs to be transmitted on an emergency channel, REGULAR (or unset) otherwise; routing: the name of a pre-defined routing scheme that should be applied to this data.

Regardless of whether API calls are batched or not, the hub batches, compresses, and encrypts all data prior to transmitting it over the network. In addition to ensuring a secure transmission, this ensures maximally efficient use of network bandwidth, while still providing an intuitive, developer-friendly device API.

Figure 5:
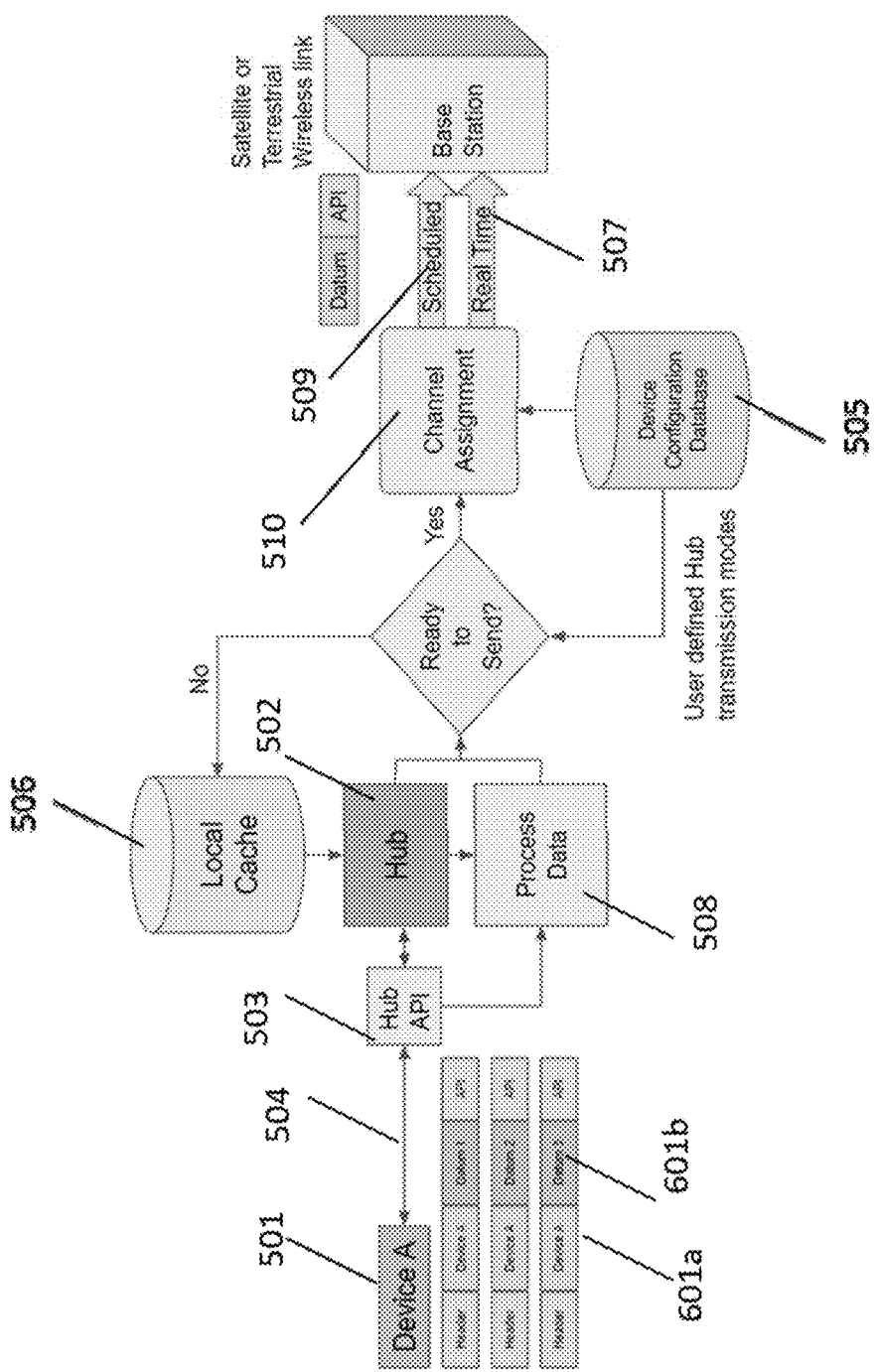
FIG. 5 shows a non-limiting schematic diagram of the systems and networks disclosed herein; in this case, a "smart" hub that allows devices to engage with hub API to provide additional data processing instructions.

Referring to FIG. 5, in some embodiments, the hub has the ability to process and manipulate data internally ("smart hub"). In some embodiments, data source nodes 501 interact with hubs 502 using an Application Platform Interface (API) 503, through a wireless communication element 504, such as Wi-Fi, Bluetooth, LoRa, or other physical layer connection. The API allows users to specify on their nodes or devices the data payload 501b they would like to transmit, and any data packet configuration parameters, such as transmission and data aggregation preferences, destination, and priority. In some embodiments, the configuration parameters are equivalent to API configuration parameters. In some embodiments, the data packets 501a are processed based on data packet configuration parameters, user preferences or other data processing parameter 508 at the hub, optionally by the API. In some embodiments, the data packet configuration parameters, combined with the user's preferences, are stored on the device configuration database 505 and determine how to route incoming data packets. If the hub is configured by the user for scheduled network access, the incoming data from devices is stored on a local memory inside the hub (cache) 506 for later transmission via a scheduled data uplink channel 509 during the hub's scheduled transmission window. In some cases, the scheduled data uplink channel is a FIT or DBH data uplink channel. If the hub is configured for both scheduled and real-time access, all data is routed to the local cache for scheduled transmission, except incoming data flagged in the packet's configuration parameters for immediate transmission. This data is routed for transmission on the next available timeslot on the real-time access data uplink channels 507. If a hub is configured for real-time access only, all incoming data is routed for immediate transmission. The hub assigns appropriate real-time or scheduled access data channel 507, 509, 510 for transmitting data, as prescribed by the hub configuration database or by the packet configuration parameters. In some embodiments, the data is optionally transmitted via satellite or terrestrial wireless data link to a base station or to an application or data storage.

Figure 6:
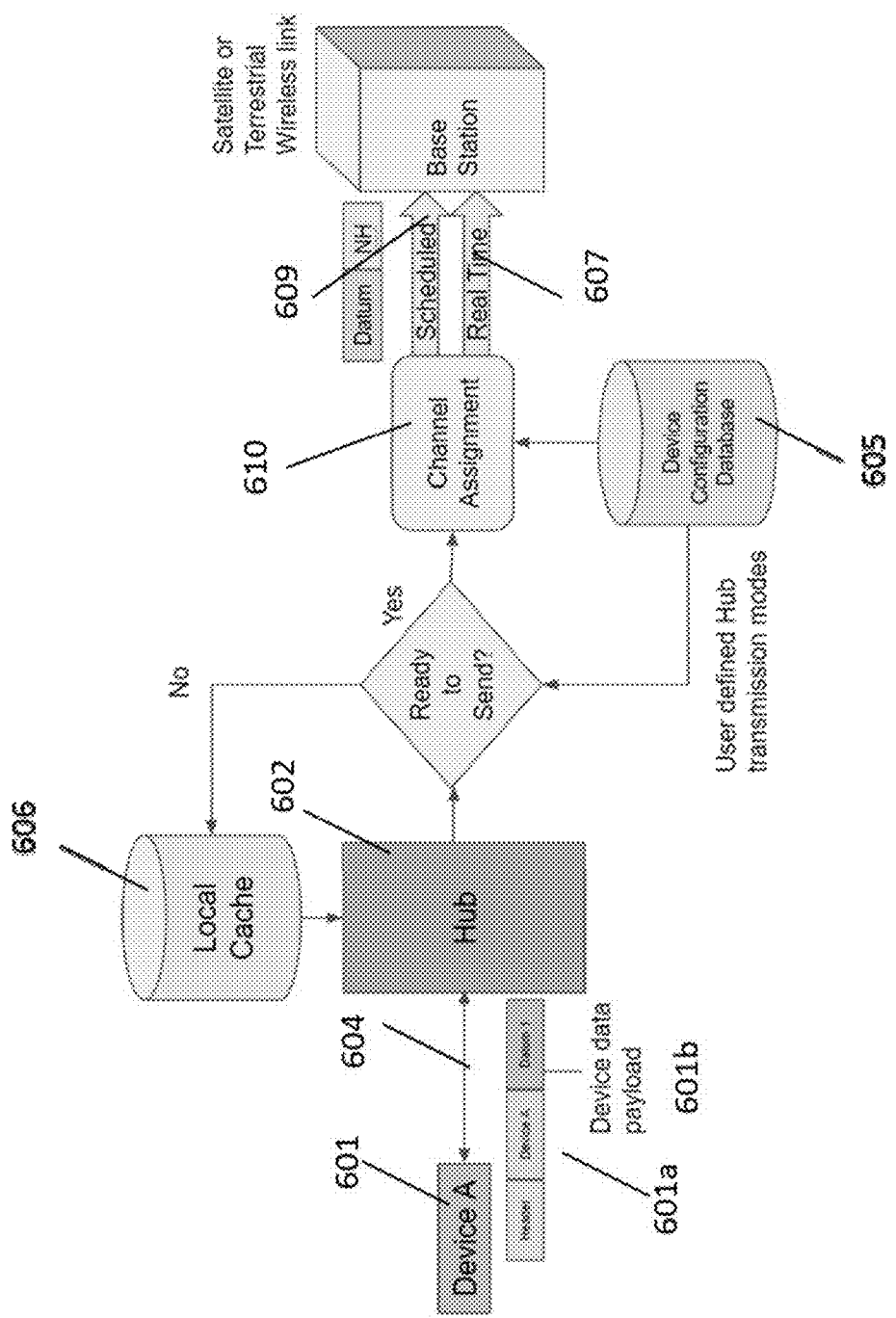
FIG. 6 shows a non-limiting schematic diagram of the systems and networks disclosed herein; in this case, a "simple" hub that relays and routes data, routed data processed on a per hub basis.

Referring to FIG. 6, in some embodiments, the hub 602 has a local storage media to serve as a cache 606 for data 601b, but does not have the ability to manipulate or aggregate data packets 601a in any way ('Simple hub'). In some embodiments, the hub works as a pass-through or relay of data in its original form. Sensors/devices/data source nodes 601 transmit their data through the hub with wireless connection, such as a Wi-Fi, Bluetooth, LoRa, or other ubiquitous physical layer connection 604. In some cases, the hub configuration database 605 dictates how data is routed through the hub. If the hub is configured for scheduled access the incoming data is routed to a local cache for later transmission via a scheduled data uplink channel 609, during the hub's scheduled transmission window. If the hub is configured for real-time access, all data is routed for immediate transmission on the next available timeslot on the real-time access data channel 607. When data is prepared to be sent, the hub switches to the appropriate real-time or scheduled access data channel 607, 609, 610, as prescribed by the hub configuration database.

Network Operations Server (NOS)

In some embodiments, the NOS herein is a server, a group of servers, or a cloud computing resource that manages movement of data among data sources, hubs and users. In some embodiments, the NOS comprises a part of the IoT. In some embodiments, the NOS includes one or more of a digital processing device, a processor, a memory, a buffer, a cache, a software, a web application, a mobile application, a management console, a software module or application for channel assignment, a wired or wireless connection, a communications element, a database, and a power source. In some embodiments, the NOS serves as the "brains" of the network that monitors, controls, and generates management instructions for other elements within the network. In some embodiments, NOS provide various functionalities, often called "services", such as sharing data or resources among multiple devices, applications, or performing data analytics for a device. A NOS can serve multiple devices, data source nodes, or sensors; a NOS can be connected to multiple hubs; and a single device, data source node, sensor, or hub can use multiple NOSs. A management console may run on the same device or may connect over a network to a NOS on a different device. In some cases, the NOS is co-located at the end of a data backhaul link, such as a satellite Earth/ground station, and has direct access to the Internet backbone into which the NOS can selectively route traffic into.

In some cases, the systems and networks herein allow users on the network to dynamically manage the multiple access protocols they would like to use for their devices and data. Node access protocols are managed on a NOS that provides a user interface or a management console for customers to select the types of access protocols they would like to assign to different types of transmissions. For example, if a node transmits both purchase information and battery health information the user may elect to assign a random access protocol to the purchasing data packets and a scheduled transmission at 9:00 pm local time for the battery health data packets. In some embodiments, the NOS maintains and distributes to the nodes current random access and scheduled transmission assignments, optionally on an as needed basis.

In some cases, each customer has the ability to define its own data-handling instructions, which can be applied globally across all of that customer's hubs and devices/nodes, or to a specific set of hubs or a specific set of devices/nodes. This includes the ability to specify transmission windows, outside of which non-emergency data cannot be transmitted; in that case, data sent outside of a transmission window will be cached on the hub and transmitted during the next transmission window. Alternately, instructions can be provided such that data are cached on the hub until the cache reaches a certain size, and then all cached data are transmitted all at once. Rules can also be defined such that data of a certain form are sent outside of regular transmission windows on an emergency channel, such as in cases where a monitored value exceeds a threshold and requires immediate attention. In some cases, before, during, or after a piece of data has been transmitted to a hub, a NOS, or a user's application, the customer can also specify how it should be handled, for example, whether it needs to be routed into a third-party data store.

In some embodiments, a data backhaul medium may be a long range data backhaul link. In some cases, the long range data backhaul link comprises a satellite data link. In further cases, the satellite data link is provided by one or more satellites in geostationary orbits. In some embodiments, a suitable geostationary orbit is an orbit of less than 45,000 km or less than 50,000 km. In a particular embodiment, a suitable geostationary orbit is an orbit of about 36,000 km. In various embodiments, the long range herein includes a range from about 30,000 km to about 50,000 km. In some cases, the long range data backhaul link comprises a terrestrial data link. In further cases, the terrestrial data link herein may comprise wired or wireless data links.

Figure 7:
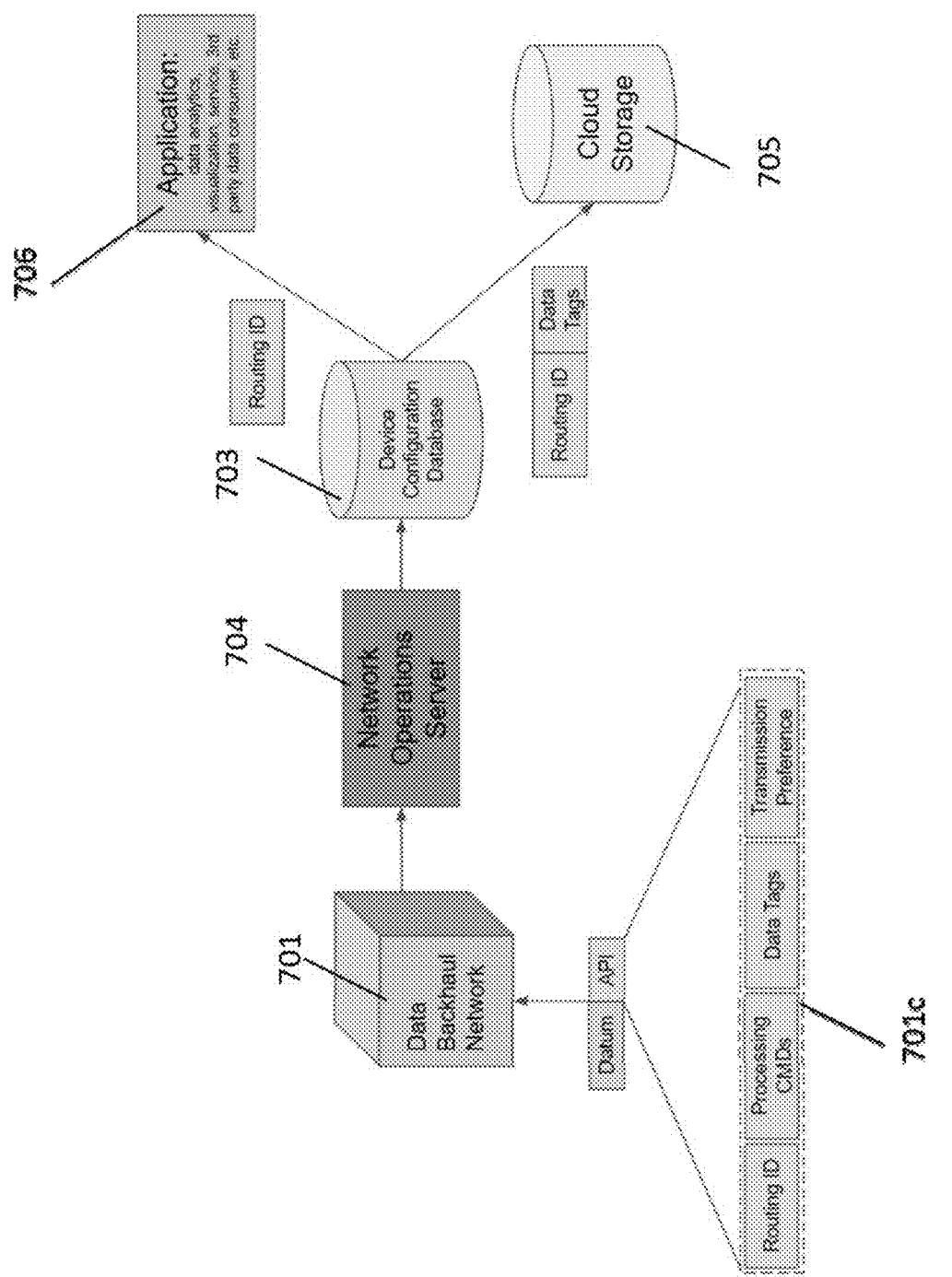
FIG. 7 shows a non-limiting schematic diagram of the systems and networks disclosed herein; in this case, a data backhaul network that includes an API that enables data packet routing and processing configuration parameters.

Referring to FIG. 7, in some embodiments, data that is passed through the hub's API, as in FIG. 5, and into the data backhaul network 701. In some cases, such data may contain additional API configuration parameters optionally include a routing ID, data processing commands, data priority tags, and transmission preferences 701c. In some cases, Routing IDs can be used to route data over the backhaul network and can be compared against a database 704 at the network operations center 703 for destination routing, whether it is a cloud storage destination 705 or a user-defined application 706. Additional API configuration parameters 701c can contain data tags or flags (binary digit, or text), for users to apply application specific tags to their data before it is routed to a cloud storage database. Exemplary data tags include a custom tag for all devices located in a user-defined geographic area, or a custom tag for all devices that match user-defined criteria, such as water level above a threshold.

In some embodiments, the NOS described herein includes a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, and tablet computers. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile OS, Linux®, and Palm WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

In some embodiments, the NOS disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In some embodiments, the NOS or the management console herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, and Samsung® Apps.

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

In some embodiments, the NOS or the management console disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the NOS disclosed herein include one or more databases, or use of the same. In view of the disclosure provided herein, those of skill in the art will recognize that many databases are suitable for storage and retrieval of user, user's account, device/node/sensor, channel assignment, access mode selection information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

While preferred embodiments of the present subject matter have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the subject matter described herein may be employed in practicing the invention.

What is claimed is:

1. A computer-implemented system comprising: a digital processing device comprising: at least one processor, an operating system configured to perform executable instructions, a memory, and instructions executable by the digital processing device to create a network operations server (NOS) application for improving efficiency of a packet-switched communications network having a plurality of data source nodes and a shared data backhaul link between the plurality of data source nodes and the NOS application, the shared data backhaul link shared by the plurality of data source nodes to access the NOS application and having bandwidth partitioned into channels, the application configured to perform at least the following:
   a) receive data packets from the plurality of data source nodes, the plurality of data source nodes comprising a sensor or an actuator generating the data packets;
   b) provide a management console allowing a user to perform at least the following:
      i) select a configuration target comprising at least one data source node, and
      ii) configure a plurality of network multi-access protocols for the selected configuration target;
   c) receive from the user the plurality of configured network multi-access protocols for the configuration target;
   d) program each data source node of the configuration target based on the plurality of configured network multi-access protocols for the configuration target; and
   e) dynamically create a channel assignment to allocate the bandwidth of the shared data backhaul link among the channels based on: the user-configured network multi-access protocols programmed in each data source node, data within each of the data packets, and a predefined level of responsiveness for the data within each of the data packets to regulate access of the data source nodes to the NOS application through the shared data backhaul link and prevent saturation and minimize data collisions in the packet-switched communications network.

2. The system of claim 1, wherein the application is further configured to coordinate with the data source nodes to provide a core set of network routing capabilities to enable the node, the type of node, or the group of nodes, to independently and dynamically route the type of data packet or the specific instance of the data packet through the network in response to the user configuration.

3. The system of claim 1, wherein the plurality of data source nodes comprises a plurality of Internet-of-Things (IoT) data source nodes.

4. The system of claim 3, wherein the plurality of data source nodes comprises at least 1,000, at least 10,000, at least 100,000, or at least 1,000,000 IoT data source nodes.

5. The system of claim 1, wherein the shared data backhaul link is bandwidth-constrained.

6. The system of claim 1, wherein the channel assignments are created and traffic is routed among channels further based on one or more channel characteristics selected of:
   frequency, bandwidth, and modulation.

7. The system of claim 1, wherein the application is configured to dynamically create a channel assignment to allocate the bandwidth and one or more time slots of the shared data backhaul link among channels based on: 1) the user-configured network multi-access protocols; and 2) management of the allocation by the NOS application in view of size of the data, priority of the data, and real-time usage of capacity of the channels to prevent saturation and minimize data collisions in the packet-switched communications network.

8. A packet-switched communications network comprising:
   a) a plurality of data source nodes, the plurality of data source nodes comprising a sensor or an actuator generating data packets; and
   b) a network operations server (NOS) receiving the data packets from the nodes via a shared data backhaul link; the shared data backhaul link between the plurality of data source nodes and the NOS, the shared data backhaul link shared by the plurality of data source nodes to access the NOS, the shared data backhaul link having bandwidth partitioned into channels;
   the NOS configured to perform at least the following:
   i) provide a management console allowing a user to perform at least the following:
      1) select a configuration target comprising at least one data source node, and
      2) configure a plurality of network multi-access protocols for the selected configuration target;
   ii) receive from the user the plurality of configured network multi-access protocols for the configuration target;
   iii) program each data source node of the configuration target based on the plurality of configured network multi-access protocols for the configuration target; and
   iv) dynamically create a channel assignment to allocate the bandwidth of the shared data backhaul link among the channels based on: the user-configured network multi-access protocols programmed in each data source node, data within each of the data packets, and a predefined level of responsiveness for the data within each of the data packets to regulate access of the data source nodes to the NOS through the shared data backhaul link and prevent saturation and minimize data collisions in the packet-switched communications network.

9. The network of claim 8, wherein the NOS is further configured to coordinate with the data source nodes to provide a core set of network routing capabilities to enable the node, the type of node, or the group of nodes, to independently and dynamically route the type of data packet or the specific instance of the data packet through the network in response to the user configuration.

10. The network of claim 8, wherein the plurality of data source nodes comprises a plurality of Internet-of-Things (IoT) data source nodes.

11. The network of claim 10, wherein the plurality of data source nodes comprises at least 1,000, at least 10,000, at least 100,000, or at least 1,000,000 IoT data source nodes.

12. The network of claim 8, wherein the shared data backhaul link is a bandwidth-constrained backhaul link.

13. The network of claim 8, wherein the channel assignments are created and traffic is routed among channels further based on one or more channel characteristics selected from: frequency, bandwidth, and modulation.

14. The network of claim 8, wherein the NOS is configured to dynamically create a channel assignment to allocate the bandwidth and one or more time slots of the shared data backhaul link among channels based on: 1) the user-configured network multi-access protocols; and 2) management of the allocation by the NOS in view of size of the data, priority of the data, and real-time usage of capacity of the channels to prevent saturation and minimize data collisions in the packet-switched communications network.

15. A computer-implemented system comprising: a digital processing device comprising: at least one processor, an operating system configured to perform executable instructions, a memory, and instructions executable by the digital processing device to create a network operations server (NOS) application for improving efficiency of a packet-switched communications network having a plurality of data source nodes and a shared data backhaul link between the plurality of data source nodes and the NOS application, the shared data backhaul link shared by the plurality of data source nodes to access the NOS application and having bandwidth partitioned into channels, the application configured to perform at least the following:
  a) receive data packets from the plurality of data source nodes, the plurality of data source nodes comprising a sensor or an actuator generating the data packets and at least one human-operated node generating human-to-machine communications (H2M) and at least one machine-operated node generating machine-to-machine (M2M) communications;
  b) provide a management console allowing a user to perform at least the following:
    i) select a configuration target, the configuration target comprising at least one human-operated node, at least one machine-operated node, or at least one human-operated node and at least one machine-operated node, and
    ii) configure a plurality of network multi-access protocols for the selected configuration target;
  c) receive from the user the plurality of configured network multi-access protocols for the configuration target;
  d) program each data source node of the configuration target based on the plurality of configured network multi-access protocols for the configuration target; and
  e) dynamically allocate the bandwidth of the shared data backhaul link among one or more channels that use random access protocols and one or more channels that use scheduled access protocols among the nodes based on: the user-configured network multi-access protocols programmed in each data source node, data within each of the data packets, and a predefined level of responsiveness for the data within each of the data packets to adjust for temporal requirements of the H2M communications and the M2M communications thus regulating access of the data source nodes to the NOS application through the shared data backhaul link and preventing saturation and minimizing data collisions in the packet-switched communications network.

16. The system of claim 15, wherein the application is further configured to coordinate with the data source nodes to provide a core set of network routing capabilities to enable a node, a type of node, or a group of nodes, to independently and dynamically route a type of data packet or a specific instance of a data packet through the network in response to the user configuration.

17. The system of claim 15, wherein the plurality of data source nodes comprises at least 1,000, at least 10,000, at least 100,000, or at least 1,000,000 machine-operated data source nodes.

18. The system of claim 15, wherein the shared data backhaul link is capacity-constrained.

19. The system of claim 15, wherein the network capacity is allocated among channels further based on channel characteristics selected from: frequency, bandwidth, and modulation.

20. The system of claim 15, wherein the application is configured to dynamically create a channel assignment to allocate the bandwidth and one or more time slots of the shared data backhaul link among channels based on: 1) the user-configured network multi-access protocols; and 2) management of the allocation by the NOS application in view of size of the data, priority of the data, and real-time usage of capacity of the channels to prevent saturation and minimize data collisions in the packet-switched communications network.

21. A packet-switched communications network comprising:
  a) a plurality of data source nodes comprising at least one human-operated node generating human-to-machine communications (H2M) and at least one machine-operated node generating machine-to-machine (M2M) communications, the plurality of data source nodes comprising a sensor or an actuator generating data packets; and
  b) a network operations server (NOS) receiving the data packets from the data source nodes via a shared data backhaul link;
    the shared data backhaul link between the plurality of data source nodes and the NOS, the shared data backhaul link shared by the plurality of data source nodes to access the NOS, the shared data backhaul link having bandwidth partitioned into channels;
    the NOS configured to perform at least the following:
    i) provide a management console allowing a user to perform at least the following:
      1) select a configuration target, the configuration target comprising at least one human-operated node, at least one machine-operated node, or at least one human-operated node and at least one machine-operated node, and
      2) configure a plurality of network multi-access protocols for the selected configuration target;
    ii) receive from the user the plurality of configured network multi-access protocols for the configuration target;
    iii) program each data source node of the configuration target based on the plurality of configured network multi-access protocols for the configuration target; and
    iv) dynamically allocate the bandwidth of the shared data backhaul link among one or more channels that use random access protocols and one or more channels that use scheduled access protocols among the nodes based on: the user-configured network multi-access protocols programmed in each data source node, data within each of the data packets, and a predefined level of responsiveness for the data within each of the data packets to adjust for temporal requirements of the H2M communications and the M2M communications thus regulating access of the data source nodes to the NOS through the shared data backhaul link and preventing saturation and minimizing data collisions in the packet-switched communications network.

22. The network of claim 21, wherein the NOS is further configured to coordinate with the data source nodes to provide a core set of network routing capabilities to enable a node, a type of node, or a group of nodes, to independently and dynamically route a type of data packet or a specific instance of a data packet through the network in response to the user configuration.

23. The network of claim 21, wherein the plurality of data source nodes comprises at least 1,000, at least 10,000, at least 100,000, or at least 1,000,000 machine-operated data source nodes.

24. The network of claim 21, wherein the shared data backhaul link is a bandwidth-constrained backhaul link.

25. The network of claim 21, wherein the bandwidth is allocated among channels further based on channel characteristics selected from: frequency, bandwidth, and modulation.

26. The network of claim 21, wherein the NOS is configured to dynamically create a channel assignment to allocate the bandwidth and one or more time slots of the shared data backhaul link among channels based on: 1) the user-configured network multi-access protocols; and 2) management of the allocation by the NOS in view of size of the data, priority of the data, and real-time usage of capacity of the channels to prevent saturation and minimize data collisions in the packet-switched communications network.

* * * * *